United States Patent
Mildh et al.

(10) Patent No.: US 11,432,207 B2
(45) Date of Patent: Aug. 30, 2022

(54) HANDLING OF PDCP VERSION CHANGE

(71) Applicant: Telefonaktiebolaget LM Ericsson (publ), Stockholm (SE)

(72) Inventors: Gunnar Mildh, Sollentuna (SE); Oumer Teyeb, Solna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 505 days.

(21) Appl. No.: 16/182,979

(22) Filed: Nov. 7, 2018

(65) Prior Publication Data

US 2019/0150037 A1 May 16, 2019

Related U.S. Application Data

(60) Provisional application No. 62/587,252, filed on Nov. 16, 2017.

(51) Int. Cl.
*H04W 36/00* (2009.01)
*H04L 9/40* (2022.01)
(Continued)

(52) U.S. Cl.
CPC ....... *H04W 36/0022* (2013.01); *H04L 63/205* (2013.01); *H04W 12/041* (2021.01);
(Continued)

(58) Field of Classification Search
CPC .............. H04L 63/205; H04W 12/041; H04W 36/0005; H04W 36/0022; H04W 36/0033;
(Continued)

(56) References Cited

U.S. PATENT DOCUMENTS

2020/0178128 A1\* 6/2020 Ingale ................ H04W 12/04
2020/0245401 A1\* 7/2020 Ingale ................ H04W 12/04

FOREIGN PATENT DOCUMENTS

| CN | 102340886 A | 2/2012 |
| CN | 105594251 A | 5/2016 |

OTHER PUBLICATIONS

HTC et al.: "Support of full configuration per CG", 3GPP Draft; R2-1711666, 3rd Generation Partnership (3GPP), Mobile Competence Centre; Oct. 2017, hereinafter NPL (Year: 2017).\*

(Continued)

*Primary Examiner* — Melvin C Marcelo
*Assistant Examiner* — Natali Pascual Peguero
(74) *Attorney, Agent, or Firm* — Murphy, Bilak & Homiller, PLLC

(57) ABSTRACT

A wireless device is configured to support connections to one or more serving cells in a first radio access network (RAN), using a first radio access technology (RAT) and to one or more serving cells in a second RAN, using a second RAT that differs from the first RAT. The wireless device receives one or more handover commands as part of a handover of the wireless device to a base station in the first RAN, and determines, based on the one or more handover commands, that the wireless device is to revert from a currently configured Packet Data Convergence Protocol (PDCP) configuration to a PDCP configuration associated with the first RAT. The wireless device then reverts to the PDCP configuration associated with the first RAT, in response to said determining.

10 Claims, 16 Drawing Sheets

(51) Int. Cl.
*H04W 12/041* (2021.01)
*H04W 12/10* (2021.01)

(52) U.S. Cl.
CPC ... *H04W 36/0005* (2013.01); *H04W 36/0033* (2013.01); *H04W 36/0038* (2013.01); *H04W 36/0066* (2013.01); *H04W 36/0083* (2013.01); *H04W 12/10* (2013.01)

(58) Field of Classification Search
CPC ......... H04W 36/0038; H04W 36/0066; H04W 36/0083; H04W 12/10
USPC ........................................ 370/310, 330, 331
See application file for complete search history.

(56) References Cited

OTHER PUBLICATIONS

3GPP TS 36.331 V14.0.0 (Sep. 2016) (Release 14) (Year: 2016).*
Ericsson: "Clause 8.3.1.1.1 (Key Derivation in Handover Key Chaining model"; 3GPP Draft; S3-172323 (Year: 2017).*
Ericsson: "Security in LTE-NR interworking"; 3GPP Draft; R2-1702716 (Year: 2017).*
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.4.0, Sep. 2017, 1-329.
3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, Oct. 2017, 1-50.
3GPP, "3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.4.0, Sep. 2017, 1-43.
3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, 1-753.
3GPP, "3rd Generation Partnership Project; Technical Specification Group Radio Access Network; NR; Packet Data Convergence Protocol (PDCP) specification (Release 15)", 3GPP TS 38.323 V1.0.0, Sep. 2017, 1-29.
3GPP, "3rd Generation Partnership Project; Technical Specification Group Radio Access Network; NR; Radio Resource Control (RRC); Protocol specification (Release 15 )", 3GPP TS 38.331 V0.1.0, Oct. 2017, 1-42.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.1.0, Sep. 2017, 1-397.
Unknown, Author , "PDCP version for SRB1 and SRB2", Ericsson, 3GPP TSG-RAN WG2 #99bis, R2-1710511, Prague, Czech Republic, Oct. 9-13, 2017, 1-3.
3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 1-644.
Unknown, Author , "Clause 8.3.1.1.1 (key derivation in handover key chaining model)—Disc", Ericsson, 3GPP TSG SA WG3 (Security) Meeting #88Bis, S3-172323, Singapore, Oct. 9-13, 2017, 1-2.
Unknown, Author , "Handover procedures during Interworking from 5GC to EPC", Huawei, Hisilicon, 3GPP TSG SA WG3 (Security) Meeting #88Bis, S3-172268, Singapore, Singapore, Oct. 9-13, 2017, 1-2.
Unknown, Author , "PDCPversion change for SRBs", Ericsson, 3GPP TSG-RAN WG2 #100, R2-1713438, Reno, Nevada, Nov. 27-Dec. 1, 2017, 1-4.
Unknown, Author , "Proposal for a new subclause 9.X on mapping of security contexts during Interworking between 4G and 5G", Ericsson, 3GPP TSG SA WG3 (Security) Meeting #89, S3-173348, Reno (US), Nov.-Dec. 1, 2017, 1-4.
Unknown, Author , "Remaining issues of Bearer type harmonisation", CATT, 3GPP TSG-RAN WG2 Meeting #99, R2-1707885, Berlin, Germany, Aug. 21-25, 2017, 1-4.
Unknown, Author , "RRC procedures for inter-RAT mobility from NR to E-UTRA", Ericsson, 3GPP TSG.RAN WG2 #101, R2-1802643, Athens, Greece, Feb. 26-Mar. 2, 2018, 1-4.
Unknown, Author , "Security in LTE-NR interworking", Ericsson, 3GPP TSG-RAN WG2 #97bis, R2-1702716, Spokane, USA, Apr. 3-7, 2017, 1-6.
Unknown, Author , "Security key update during handover", Ericsson, 3GPP TSG-RAN WG2 #101 Bis, R2-1804798, Sanya, P. R. of China, Apr. 16-20, 2018, 1-6.
Unknown, Author , "Security key update for NR SA and MR-DC", Ericsson, 3GPP TSG-RAN WG2 #102, R2-1807043, Busan, S. Korea, May 21-25, 2018, 1-10.
Unknown, Author , "Support of full configuration per CG", HTC, MediaTek, 3GPP TSG-RAN WG2#99bis, R2-171 1666, Prague, Czech Republic, Oct. 9-13, 2017, 1-5.
Unknown, Author , "Proposal for a new subclause 9.X on mapping of security contexts during interworking between 4G and 5G", 3GPP TSG SA WG3 (Security) Meeting #88-Bis, S3-172407, Singapore, Oct. 9-13, 2017, 1-2.
Unknown, Author , "Summary of 99#18 Bearer Type Change (Huawei)", 3GPP TSG-RAN WG2 #99bis, R2-1711090, Prague, CZ, Oct. 9-13, 2017, 1-32.

* cited by examiner

FIG. 4 *Prior Art*

HANDLING OF PDCP VERSION CHANGE

TECHNICAL FIELD

The present disclosure generally relates to the field of wireless network communications, and more particularly, to a wireless device configured to support connections to serving cells in a first radio access network (RAN), using a first radio access technology (RAT), and to serving cells in a second RAN, using a second RAT that differs from the first RAT.

BACKGROUND

Evolved Packet System (EPS) is the Evolved 3GPP Packet Switched Domain and includes Evolved Packet Core (EPC) and Evolved Universal Terrestrial Radio Access Network (E-UTRAN). The EPC architecture is defined in 3GPP TS 23.401, which provides definitions of the PGW (PDN Gateway), SGW (Serving Gateway). PCRF (Policy and Charging Rules Function). MME (Mobility Management Entity), and mobile device (UE). The Long-Term Evolution (LTE) radio access, E-UTRAN, includes one or more eNBs (also referred to as base stations).

An overall E-UTRAN architecture is further defined, for example, in 3GPP TS 36.300. The E-UTRAN includes eNBs, providing the E-UTRA user plane (PDCP/RLC/MAC/PHY or Packet Data Convergence Protocol/Radio Link Control/Medium Access Control/Physical Layer) and control plane (Radio Resource Control, or RRC) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface.

In the Evolved Universal Terrestrial Radio Access Network (E-UTRAN), which is widely referred to as Long Term Evolution (LTE), the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (sometimes referred to as "compiling the configuration"), and if this succeeds the UE generates an RRC complete message that indicates the transaction ID of the message that triggered this response.

Since LTE Release 8, three Signaling Radio Bearers (SRBs), namely SRB0. SRB1 and SRB2 have been available for the transport of RRC and Non Access Stratum (NAS) messages between the UE and eNB. A new SRB, known as SRB1bis, was also introduced in Release 13, for supporting DoNAS (Data Over NAS) in NB-IoT.

SRB0 carries RRC messages using the CCCH logical channel, and is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel. SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

LTE Dual Connectivity (DC)

LTE Dual Connectivity (DC) is standardized in 3GPP Release 12 to enable UEs to send and receive data on multiple carriers at the same time (e.g., multiple TX/RX). As described in 3GPP TS 36.300, E-UTRAN supports DC operation whereby a multiple transceiver (Rx/Tx) UE in RRC_CONNECTED is configured to utilize radio resources provided by two distinct schedulers, located in two eNBs (base stations) connected via a non-ideal backhaul over the X2 interface (see 3GPP TR 36.300). eNBs involved in DC for a certain UE may assume two different roles: an eNB may either act as an MeNB (Master eNB or MN) or as an SeNB (Secondary eNB or SN). In DC, a UE is connected to one MN and one SN. An eNB can act both as an MN and an SN at the same time, for different UEs.

In LTE DC, the radio protocol architecture that a particular bearer uses depends on how the bearer is setup. Three bearer types are MCG (Master Cell Group) bearer, SCG (Secondary Cell Group) bearer, and split bearer. RRC is managed in a MeNB, and SRBs (Signaling Radio Bearers) are always configured as MCG bearer type and therefore only use the radio resources of the MeNB. Only MeNB has RRC connection with UE, therefore, only MeNB can send RRC signaling toward UE. For mobility measurements. MeNB configures a UE for which frequency to measure and how to report, etc. Correspondingly, the UE sends measurement results to the MeNB once a criterion is met. Note that DC can also be described as having at least one bearer configured to use radio resources provided by the SeNB.

Inter-eNB control plane signaling for DC is performed by means of X2 interface signaling. Control plane signaling towards the MME is performed by means of S1 interface signaling. There is only one S1-MME connection per DC UE between the MeNB and the MME. Each eNB should be able to handle UEs independently, i.e., provide the PCell to some UEs while providing SCell(s) for SCG to others. Each eNB involved in DC for a certain UE controls its radio resources and is primarily responsible for allocating radio resources of its cells. Respective coordination between MeNB and SeNB is performed by means of X2 interface signaling.

NR Dual Connectivity and LTE-NR Tight Interworking

3GPP has continued with efforts to standardize a new radio interface for 5G, often abbreviated by NR (New Radio). LTE-NR DC (also referred to as LTE-NR tight interworking) is being defined for Release 15 of the 3GPP specifications. In this context, major changes from LTE DC include the introduction of split bearer from the SN, which is referred to as SCG split bearer. The SN in this particular case is also referred to as secondary gNB, or SgNB, where gNB is 3GPP terminology for an NR base station. Major changes also include the introduction of split bearer for RRC, which is referred to as split SRB, and the introduction of a direct RRC from the SN, which is referred to as SCG SRB or direct SRB. FIGS. 1 and 2 show the User Plane (UP) and Control Plane (CP) architectures for NR dual connectivity and LTE-NR tight interworking.

From FIGS. 1 and 2, it can be seen that separate SRBs are supported both from the MN and SN. This means that a UE can receive signaling messages, or RRC messages, both from the MN and the SN. There will thus be two RRC instances responsible for controlling the UE—one directed from the MN and another from the SN in the depicted scenario.

The consequence of this architecture is that the UE needs to terminate RRC signaling from two instances: both from the MN and the SN. The motivation for introducing such multiple RRC instances in NR DC, and in particular for LTE-NR DC, is that the MN and SN will each partly be autonomously responsible for the control of radio resources. For example, the MN is allocating resources from some spectrum using LTE, while the SN will be responsible for configuring and allocating resources from some other spectrum that uses NR. As challenges for allocating resources in LTE and NR may differ substantially (e.g., since NR might be allocated in a spectrum where beam-forming is highly desirable, while LTE might be allocated in a spectrum with good coverage but with very congested resources), it is important that the SN has some level of autonomy to configure and manage the UE on resources associated with the SN. On the other hand, the overall responsibility for connectivity to the UE will likely be at MN node, so the MN node has the overall responsibility, for example, for mobility, state changes of the UE, for meeting quality of service demands of the UE, etc.

The MN and SN may be nodes that use LTE (4G) or NR (5G) radio access technologies. They may both support the same technology, or they may support different technologies. The SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB.

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for the UL, the network configures the UE to use the MCG, SCG or both legs. The terms "leg" and "path" are used interchangeably throughout this document.

From the UE perspective, both the cells it operates in LTE and the cells it operates in NR are its serving cells.

The following terminologies are used throughout this text to differentiate different dual connectivity scenarios: DC: LTE DC (i.e. both MN and SN employ LTE); EN-DC: LTE-NR dual connectivity where LTE is the master and NR is the secondary: NR-DC (or NR-NR DC): both MN and SN employ NR; and MR-DC (multi-RAT DC), which is a generic term to describe where the MN and SN employ different RATs (EN-DC is one example of MR-DC).

Bearer Harmonization in EN-DC

In the current work in 3GPP, it has been agreed to harmonize what was former called MCG bearers. MCG split bearers, SCG bearers and SCG split bearers in the following way:

It is possible to configure the UE to use NR PDCP for all the bearers (even when the UE is operating in stand-alone LTE mode and EN-DC is not setup). It is also possible to configure the use of NR PDCP for SRBs.

For all bearers configured with NR PDCP it is possible to configure the UE to either use KeNB or S-KeNB as security key (S-KeNB is also referred to as S-KgNB in the context of EN-DC)

The configuration of the PDCP layers is separated from the configuration of the lower layers of the MCG and SCG leg.

From a UE point of view this means that there are only 3 different bearers, as seen in FIG. 3, namely the:

MCG bearer which uses the radio of the MN node only,

SCG bearer which uses the radio of the SN node only, and the split bearer which uses the radio of both the MN and SN.

In this example, the security key (KeNB or S-KeNB) is configurable per bearer. Where these bearers are terminated in the network is not important from the UEs perspective anymore. i.e., the UE will just use the key that is being configured from each bearer. From the current perspective of the 3GPP, it is fully supported to setup MCG bearers being terminated in the SN node using S-KeNB and SCG bearers being terminated in the MN node. Similarly, it is possible to support both SN and MN terminated bearers at the same time, i.e., both SN terminated split bearers and MN terminated split bearers.

Handover in LTE

In LTE, handover is performed using an RRC Connection Reconfiguration procedure including Mobility control info. The procedure is initiated by the network. In case the handover involves the change of not only radio cell but also network node (e.g., eNB) the handover will also involve signaling in the network as shown in FIG. 4, which is taken from 3GPP TS 36.300. The figure shows an inter-eNB handover using the X2 interface. There are also many other handover scenarios supporting including S handover, inter-MME handover, inter-serving GW handover, inter RAT handover.

SUMMARY

Disclosed herein are techniques, apparatuses, and systems for enhancing the current UE behavior during handover (HO), so that a UE that has been configured with NR PDCP will switch to LTE PDCP for SRB1 (and other SRBs) when performing a handover to a legacy eNB. The switch to LTE PDCP also includes functionality to support changing of security algorithms for integrity protection and ciphering from NR algorithms to LTE algorithms, in various embodiments. These techniques support handover scenarios where the UE starts with an SRB1 configured with NR PDCP but the target eNB doesn't support NR. Supporting such handover scenarios minimizes service interruption compared to solutions where the whole RRC connection has to be re-established in the target node.

The techniques also have the advantage that no changes are required in legacy eNBs, avoiding costly upgrades of legacy eNBs.

According to an example method according to some of the presently disclosed techniques, a wireless device is configured to support connections to one or more serving cells in a first radio access network (RAN), using a first radio access technology (RAT) and to one or more serving cells in a second RAN, using a second RAT that differs from the first RAT. The wireless device receives one or more handover commands as part of a handover of the wireless device to a base station in the first RAN, and determines, based on the one or more handover commands, that the wireless device is to revert from a currently configured Packet Data Convergence Protocol (PDCP) configuration to a PDCP configuration associated with the first RAT. This determining may be based on determining that the one or more handover commands include an indication that a full configuration should be used, for example. The wireless device then reverts to the PDCP configuration associated with the first RAT, in response to said determining.

According to another example method in a user equipment (UE) for performing handover according to some of the presently disclosed techniques, the UE receives a handover command while operating with a Signaling Radio Bearer 1 (SRB1) configured with New Radio (NR) Packet Data Convergence Protocol (PDCP). The handover command includes an indication that full configuration should be used; and the UE reverts to Long Term Evolution (LTE) PDCP configuration for SRB1 responsive to determining that the handover command includes the indication that full configuration should be used.

Further aspects of the present invention are directed to base station methods and apparatuses, as well as to apparatuses, computer program products or computer readable storage medium corresponding to the methods summarized above.

Of course, the present invention is not limited to the above features and advantages. Those of ordinary skill in the art will recognize additional features and advantages upon reading the following detailed description, and upon viewing the accompanying drawings.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment.

Usage of NR PDCP for SRB1 (and SRB2)

In 3GPP, it has been agreed to support the usage of NR PDCP for SRB1 for EN-DC as well as when operating in LTE. In particular, NR PDCP will be used for SRBs which are configured as Split bearers since LTE PDCP is not expected to support split bearers.

The configuration of NR PDCP for SRBs has been discussed in 3GPP. The basic principle is that the UE receives an RRC connection reconfiguration message which indicates to the UE that SRB1 and/or SRB2 should be configured with NR PDCP. The UE will, from this message, apply NR PDCP for these SRBs. The configuration of NR PDCP could, for instance, be configured with an RRC connection message which also included mobility control info (meaning a handover message). In this case the UE will apply the new configuration in the target node.

Figure 5:
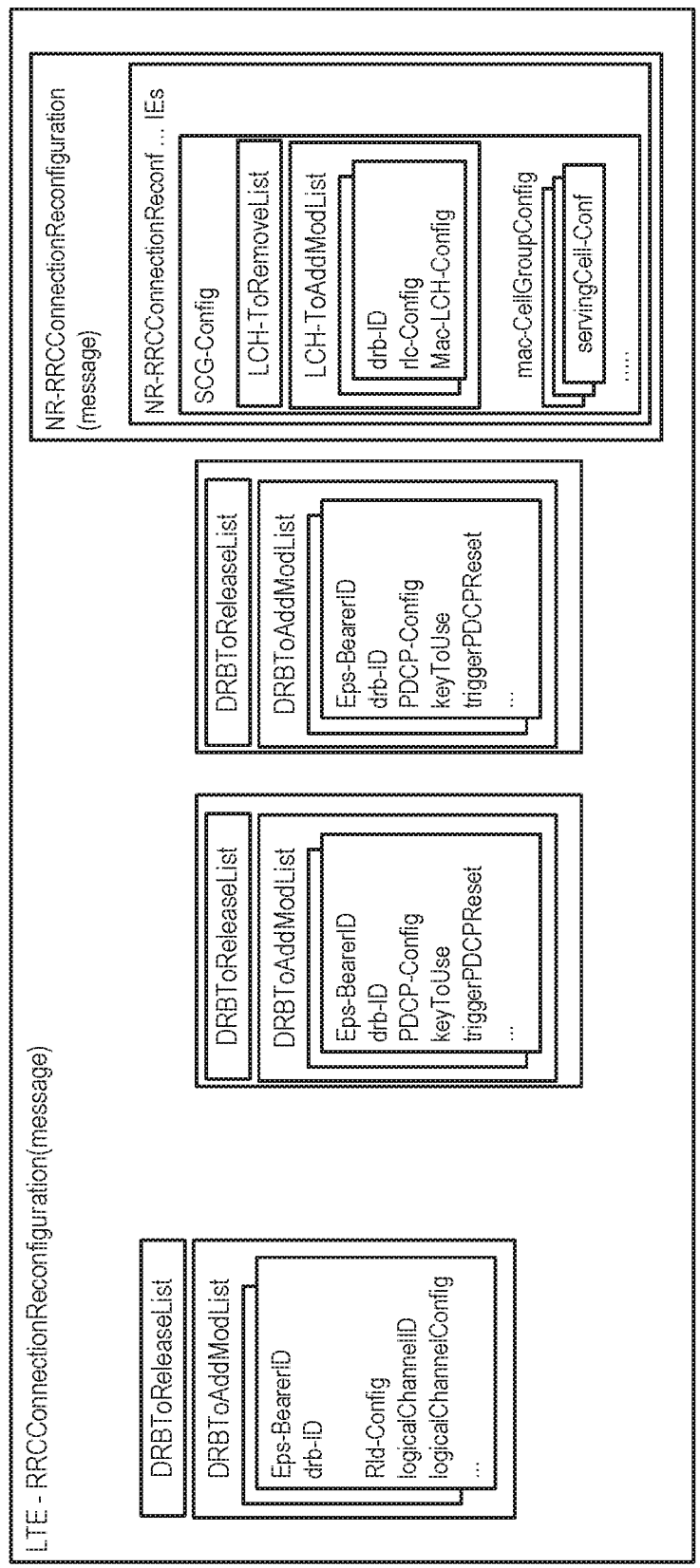
FIG. 5 shows an example RRC connection reconfiguration message.

FIG. 5 illustrates the structure of the RRC reconfiguration message. The three boxes to the right are embedded NR RRC message used to configure the NR radio interface as well as the NR PDCP configuration.

RRC Handling of SRB PDCP Version Change

In 3GPP standardization efforts, it has previously been agreed that the so-called Message 5 is used to indicate the core network (CN) type. Further, it was agreed that an eNB should initially configure SRB1 with LTE PDCP. Upon receiving CN Type Selection=5GCN in Message 5, the eLTE eNB reconfigures SRB1 with NR-PDCP. Left for future study in those previous discussions was whether the reconfiguration to NR PDCP is required before the Security Mode Command (SMC), when connecting to the 5GCN. However, it was further agreed that these decisions could be revisited, leaving open the possibility that a solution where the eNB initially configures SRB1 with NR-PDCP could be adopted.

SRB PDCP version change is also a consideration. By version change is meant a change from NR PDCP to LTE PDCP or vice-versa. Several approaches for how to manage the change are described below.

In 3GPP TS 36.331, srb-ToAddMod does not include PDCP configuration. In 5.3.10.1 of this specification, the PDCP entity is established and configured with MCG security configuration during SRB establishment, i.e., for each srb-Identity that is not part of the current UE configuration. This is because during connection establishment LTE PDCP is always configured.

LTE PDCP to NR PDCP

A first approach proceeds as follows. When the PDCP version of an SRB is to be changed from LTE PDCP to NR PDCP, the NR PDCP configuration is provided in pdcp-Config of srb-ToAddMod in RadioBearerConfig for corresponding srb-Identity. The procedure text in 3GPP TS 38.331 then triggers the release of the LTE PDCP for the corresponding SRB:

1>for each srb-Identity value included in the srb-ToAddModList that is
 not part of the current UE configuration or configured with pdcp-
 Config (SRB establishment or reconfiguration from E-UTRA
 to NR PDCP):
 2>apply the specified configuration defined in 9.1.2 for the
 corresponding SRB;
 2>establish a PDCP entity and configure it with the security algorithms
 according to securityConfig and apply the keys (KUPenc) associated
 with the KeNB/S-KgNB as indicated in keyToUse, if applicable;
 2>if the current UE configuration as specified in TS 36.331 includes a
 SRB identified by the same srb-Identity value:
 3>associate the E-UTRA RLC and DCCH entities of this SRB with the
 NR PDCP entity;
 3>release the E-UTRA PDCP entity of this SRB;

In this solution, there is no 36.331 IE needed for this reconfiguration and no procedure text. In case split SRB is configured, rlc-Config and logicalChannel-ToAddModList are included in SecondaryCellGroupToAddModList to setup the NR SCG logical channel and RLC entity. An undesirable property of this solution is that it would introduce an E-UTRAN PDCP action in NR RRC.

In an alternative approach, the release of the LTE PDCP entity is handled in LTE RRC. An example of how this can be implemented in 3GPP TS 36.331 is shown here:

```
1> for each srb-Identity value included in the srb-ToAddModList that is
part of the current UE configuration (SRB reconfiguration or add split
SRB for EN-DC):
    2>  reconfigure the RLC entity in accordance with the received
    rlc-Config;
    2>  reconfigure the DCCH logical channel in accordance with
    the received logicalChannelConfig;
    2>  if nr-radioBearerConfig1 associated with the same SRB
    ID is received;
        3>  release the LTE PDCP entity if configured
        3>  associate MCG RLC and MCG DCCH entities with the PDCP
        entity received in nr-radioBearerConfig1 associated with the same
        SRB ID;
    2> else : (NR to LTE case)
        3>  establish a PDCP entity and configure it with the current (MCG)
security configuration, if not configured;
```

This has the benefit of keeping the LTE actions defined in 36.331, keeping NR RRC clean of LTE PDCP release. However, there are a couple of issues:

The actions in 36.331 become dependent of the presence of a field (srb-Identity) in the container radioBearer-Config. So, radioBearerConfig is no longer a transparent container from 36.331 point of view.

The procedural text assumes that the NR PDCP entity has already been established, i.e. that the nr-radioBearer-Conig1 has been processed.

NR PDCP to LTE PDCP

According to another approach, the release of the LTE PDCP entity is handled in LTE RRC, when the PDCP version of an SRB is to be changed from NR PDCP to LTE PDCP, the network signals srb-toRelease in RadioBearceConfig for the corresponding srb-Identity to release the NR PDCP entity.

The UE shall for the SRB with SRB Identity corresponding to srb-ToRelease: 1>release the PDCP entity.

If split SRB was used, logicalChannel-ToReleaseList is included in SecondaryCellGroupToAddModList in order to release the NR logical channel, as the split SRB is not supported for LTE PDCP.

To avoid the release of the entire SRB, the LTE part of the RRC message will include SRB-ToAddMod with the same srb-Identity, which will trigger the setup of the LTE PDCP for the corresponding SRB.

In 3GPP TS 37.340, it is stated that in MR-DC with 5GCN, NR PDCP is always used for all bearer types. One reason for this agreement is the security algorithms, which in the case of 5GCN will include 5G security algorithms, which may not be supported by LTE PDCP. For the same reason, it seems natural that NR PDCP should always be used also for the SRBs. This is also consistent with the agreement mentioned above, i.e., that the eLTE eNB reconfigures SRB1 with NR-PDCP when receiving a CN Type Selection indicating a 5GCN.

According to those same agreements, as noted above, unless a CN type indication in MSG3 is introduced, the eNB shall initially configure SRB1 with LTE PDCP. There is then a need for a reconfiguration from LTE PDCP to NR PDCP for the SRB1. If reconfiguration of the PDCP version to NR PDCP is performed before the Security Mode Command (SMC), then only NR PDCP and NR security algorithms need to be supported by the 5GCN. This will simplify NAS level capability signaling for security algorithms.

As discussed above, there is ongoing work in 3GPP to provide support for NR PDCP for SRBs and DRBs in LTE, e.g., to be used for scenarios when signaling or data radio bearers are deployed as split RBs sending and/or receiving data on both NR and LTE radio.

A problem is that even if some network nodes in the network are upgraded to support this new functionality (NR PDCP), it is still desirable to inter-work with (e.g., handover to and from) legacy LTE eNBs that are not upgraded to support NR PDCP. Since these nodes are not upgraded they will not be able to signal explicit indications to the UE to switch from NR to LTE PDCP. Also, the method to switch from NR to LTE PDCP is not yet defined.

Disclosed herein are techniques, apparatuses, and systems for enhancing the current UE behavior during handover (HO), so that a UE that has been configured with NR PDCP will switch to LTE PDCP for SRB1 (and other SRBs) when performing a handover to a legacy eNB. The switch to LTE PDCP also includes functionality to support changing of security algorithms for integrity protection and ciphering from NR algorithms to LTE algorithms, in various embodiments.

These techniques support handover scenarios where the UE starts with an SRB1 configured with NR PDCP but the target eNB doesn't support NR. Supporting such handover scenarios minimizes service interruption compared to solutions where the whole RRC connection has to be re-established in the target node.

The techniques also have the advantage that no changes are required in legacy eNBs, avoiding costly upgrades of legacy eNBs.

Several mechanisms described below can be used to handle the mismatch between usage of NR PDCP for SRB1 at the source eNB and the lack of support of NR PDCP at the target eNB. Note that these are described here in the context of a handover towards an LTE eNB which is not capable of supporting NR PDCP. However, these approaches may be applied more generally to a situation where a wireless device is being handed over to a base station in a first radio access network (RAN) using a first radio access technology (RAT) from a base station in a second RAN using a second RAT, where the base station in the first RAN does not support some or all aspects of the second RAT.

In an example method carried out by a UE, or more generally, a wireless device configured to support connections to one or more serving cells in a first RAN, using a first RAT and to one or more serving cells in a second RAN, using a second RAT that differs from the first RAT, on handover, the UE reverts to LTE PDCP configuration for SRB1. The sub-embodiments below include different optional triggers to revert back to LTE PDCP configuration. Combinations of several triggers could also be used. For example, a UE might require that two or more of these triggers be fulfilled before the UE reverts to LTE PDCP. The trigger for reverting could be due to that:

1A—the RRC connection reconfiguration message (handover command) includes an indication that "full configuration" should be used 1B—the RRC connection reconfiguration message (handover command) lack any embedded NR RRC information i.e. no NR PDCP configuration.

1C—the RRC connection reconfiguration message (handover command) includes SRB1 in an SRB add or modify information element.

1D—the System Information broadcast of the target cell does not include any indication that EN-DC or 5G is supported.

1E—the RRC connection reconfiguration message (handover command) does not include an NR Secondary Cell Group configuration.

Figure 1:
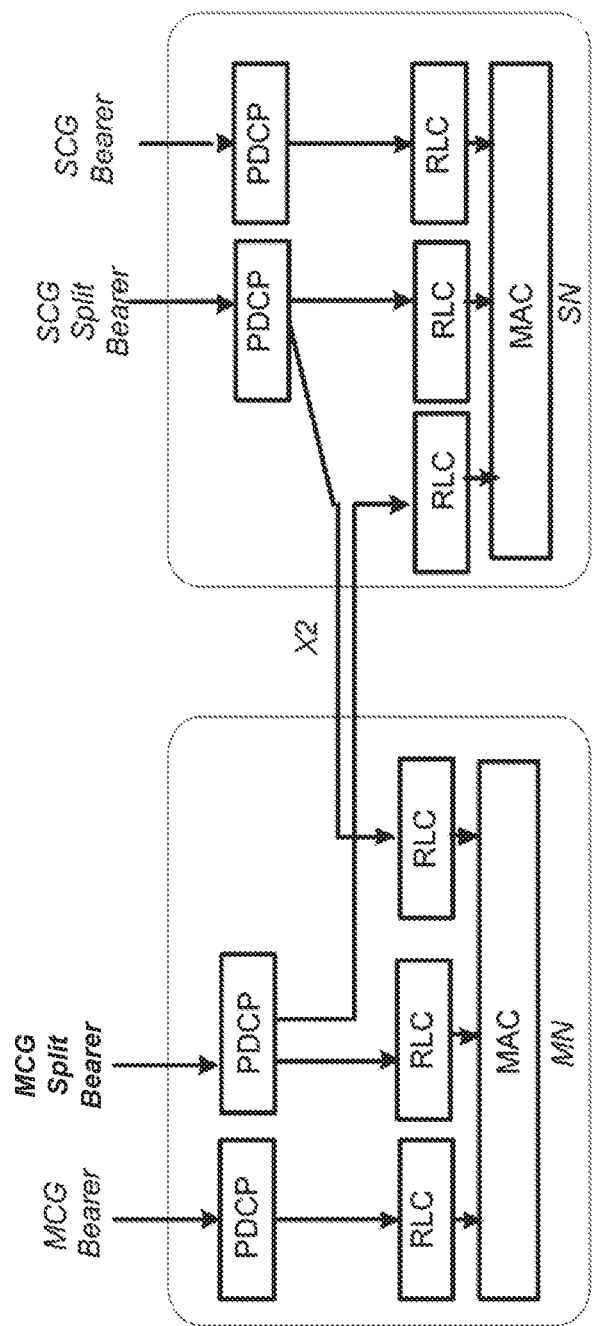
FIG. 1 illustrates LTE-NR tight interworking for the user plane (UP)
Figure 2:
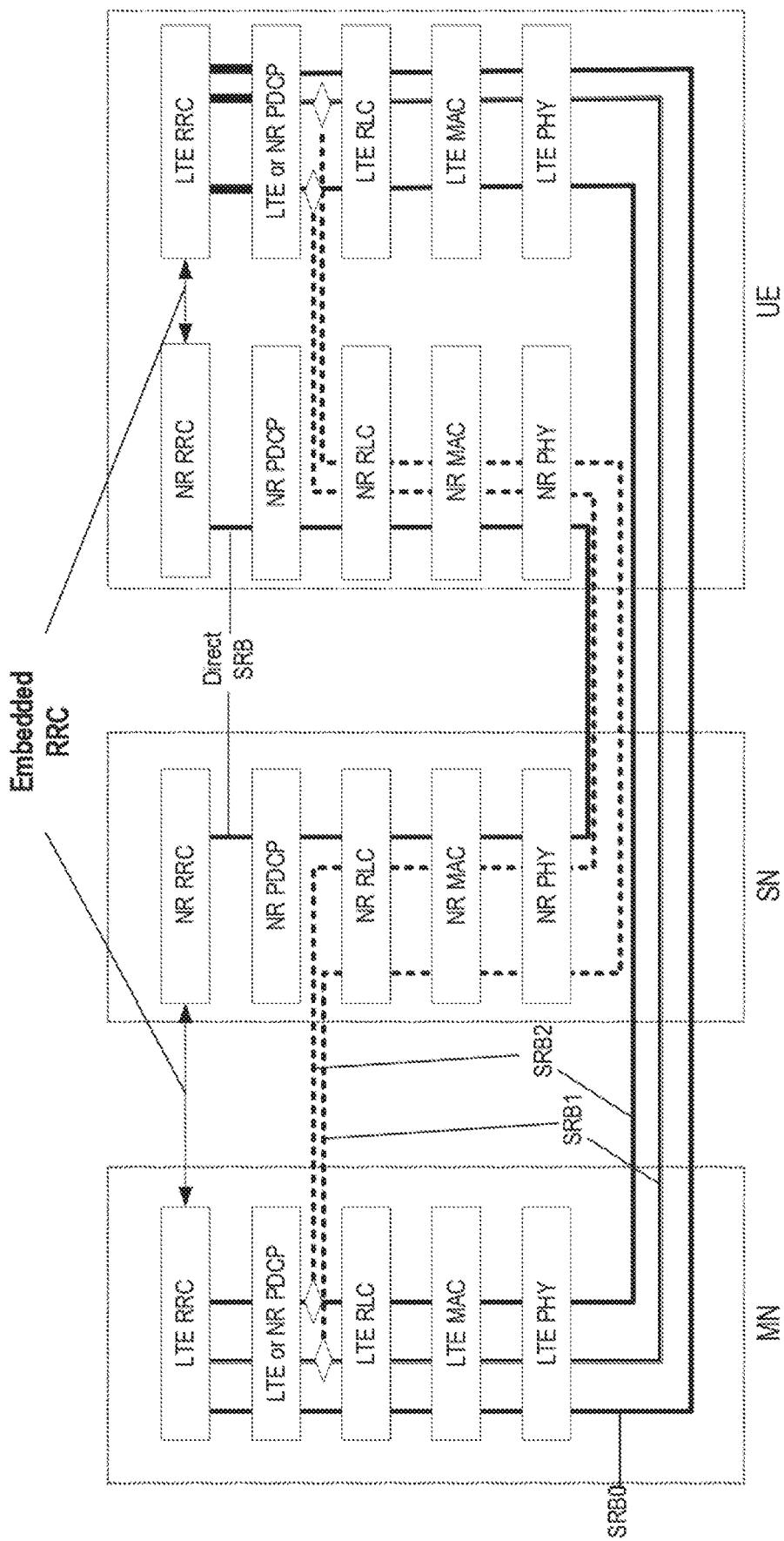
FIG. 2 is a split bearer illustration of LTE-NR tight interworking for the control plane (CP) in 5G.
Figure 3:
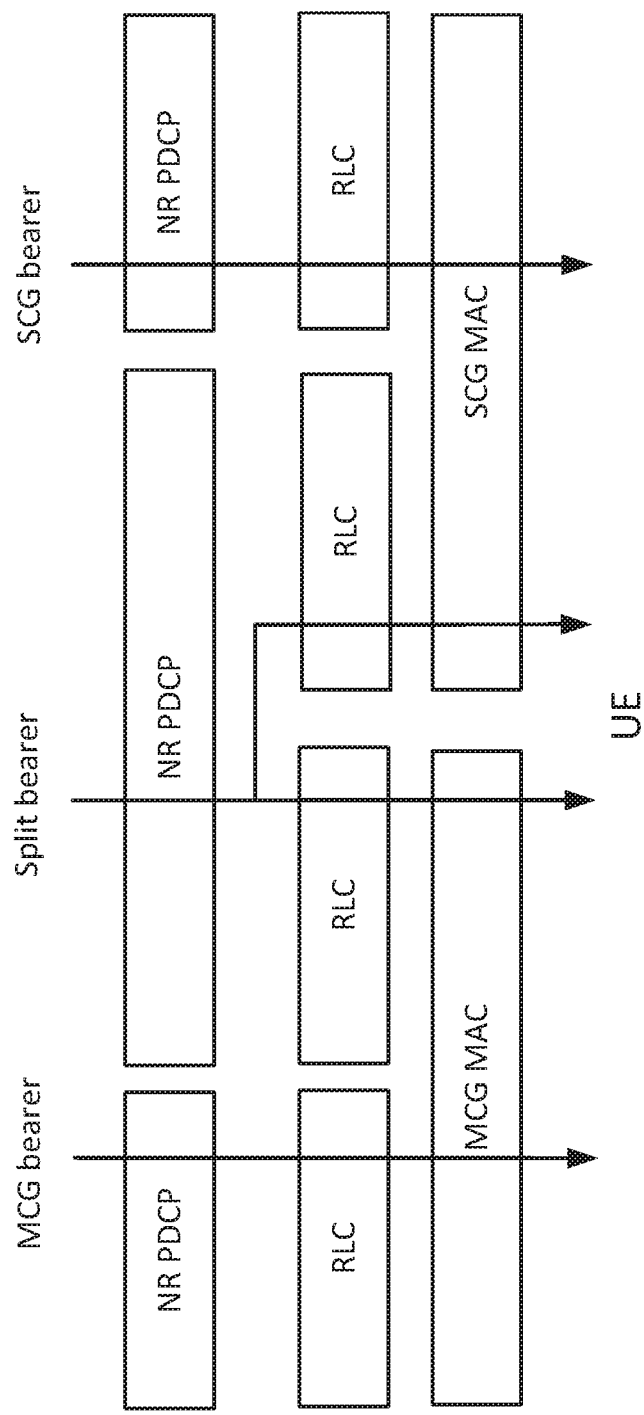
FIG. 3 illustrates three types of bearers in a dual connectivity scenario.
Figure 4:
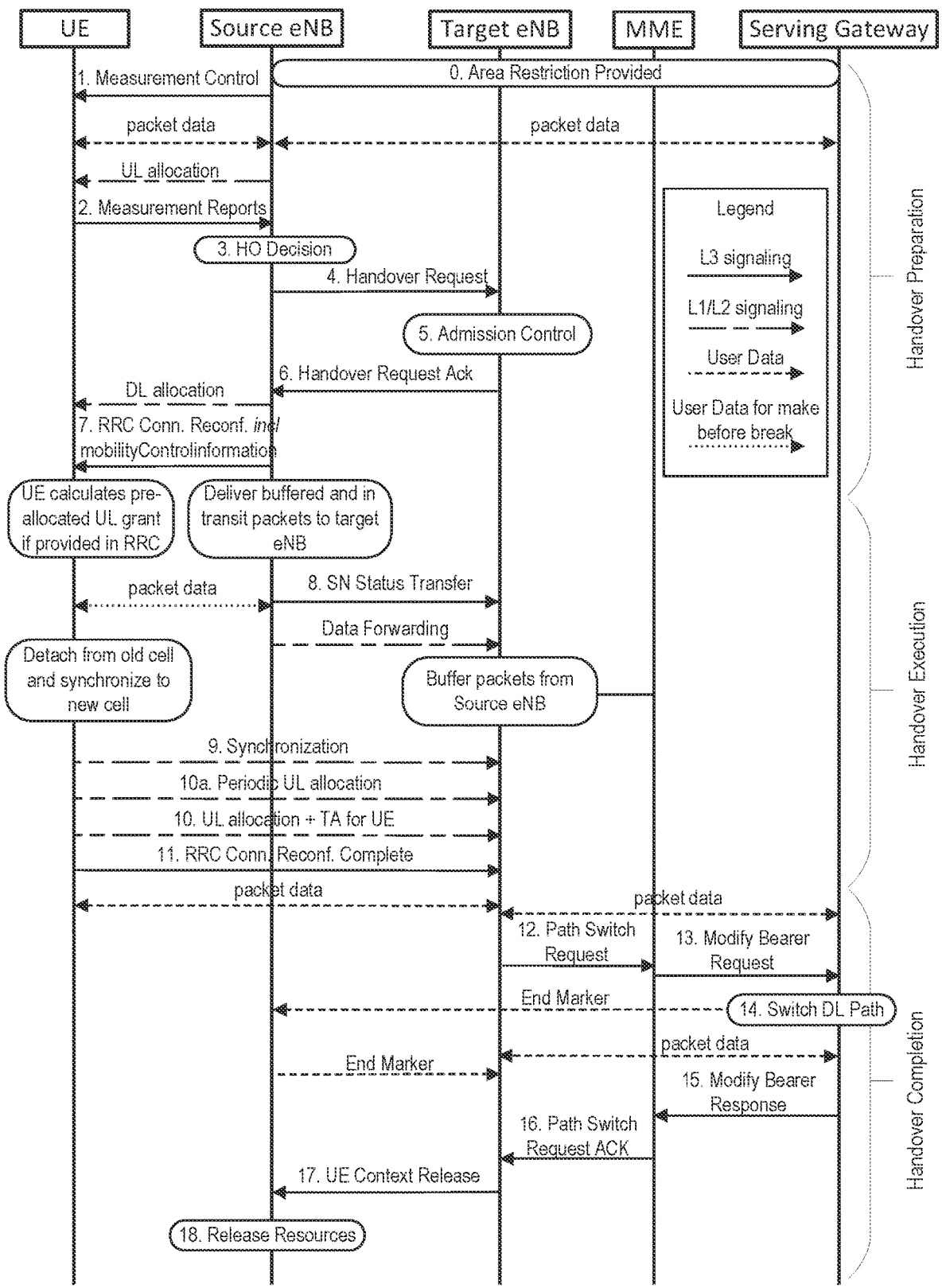
FIG. 4 illustrates details of an example handover procedure.

In some embodiments according to the above method, the UE receives the triggering indication(s) in step 7 of the handover procedure in FIG. 4.

In some embodiments, a UE or wireless device like that described above may perform the act of the reverting back to LTE PDCP in such a way that it includes one or more of the following steps:

Apply a default LTE PDCP, and/or RLC, and/or MAC configuration. The default configuration could be signaled on system information broadcast, or using dedicated signaling (e.g. RRC) or hardcoded in the specification.

Perform a security key derivation procedure using LTE key derivation procedures

Change the security algorithms for integrity protection and/or ciphering of SRBs or DRBs to LTE security algorithms for integrity protection and/or ciphering.

1. The LTE security algorithms could be default algorithms used in LTE or they could be provided to the UE using dedicated signaling in the source cell
2. The LTE security algorithms could be mapped from the NR security algorithms used in the source cell e.g. NR encryption algorithm nea1 could be mapped to LTE encryption algorithm eea1. NR integrity protection algorithm nia1 could be mapped to LTE integrity protection algorithm eia1. Mapping from NR to LTE algorithms enables, e.g., maintaining similar security characteristics after handover as before handover.
3. For new NR-only algorithms it is possible to map to a predefined (or default) LTE algorithm. The predefined (or default) LTE algorithm could either be configured in the network and signaled to the UE (e.g., when connected to NR, using NAS or RRC signaling) or it could be "hardcoded" in 3GPP specifications.

Re-establish the PDCP and/or RLC and/or MAC entities in the UE for SRBs and DRBs prior to resuming transmission in target cell. The act of re-establishment could include:

1. discarding packets not yet acknowledged by peer-protocol entity;
2. informing higher layers that packets has been discarded; and/or
3. re-setting sequence (or packet) counters.

According to some embodiments of techniques carried out in the network, a source eNB (or gNB), on determining that the target eNB is a legacy eNB that doesn't support NR, it will refrain from passing the UE AS context information to the target. In some embodiments, if a target eNB doesn't get a UE AS context from the source eNB or if it does not understand the context passed from the source eNB, (e.g., due to the usage of NR PDCP configuration for SRB1 or any other radio bearer), it will initiate full UE configuration and include a full configuration indication in the RRC connection reconfiguration message (handover command).

In some embodiments of techniques carried out in the network, if the UE is changing the PDCP version from NR to LTE, the network (e.g. the target or source eNB) can optionally perform a mapping from NR security algorithms for encryption and integrity protection to pre-defined LTE algorithms. The mappings could be one-to-one for those NR and LTE algorithms that have similar properties. For new NR-only algorithms it is possible to map to a predefined (or default) LTE algorithm. The predefined (or default) LTE algorithm could either be configured in the network and signaled to the UE (e.g., when connected to NR, using NAS or RRC signaling) or it could be "hardcoded" in 3GPP specifications.

Figure 6:
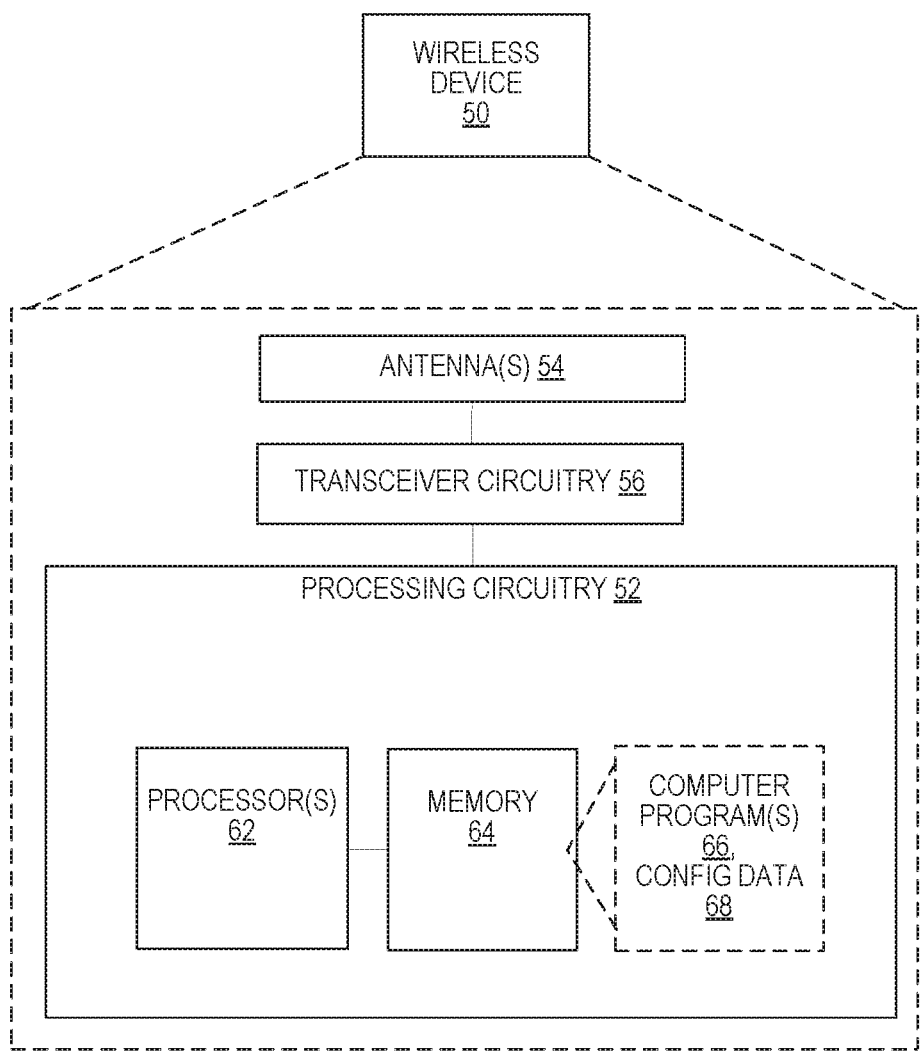
FIG. 6 is a block diagram of a wireless device, according to some embodiments.

FIG. 6 illustrates a diagram of a wireless device, shown as wireless device 50, according to some embodiments. The wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The wireless device 50 is configured to communicate with a radio network node or base station in a wide-area cellular network via antennas 54 and transceiver circuitry 56. The transceiver circuitry 56 may include transmitter circuits, receiver circuits, and associated control circuits that are collectively configured to transmit and receive signals according to one or multiple radio access technologies, for the purposes of using cellular communication services. The radio access technologies may be NR and LTE, for example.

The wireless device 50 also includes one or more processing circuits 52 that are operatively associated with the radio transceiver circuitry 56. The processing circuitry 52 comprises one or more digital processing circuits, e.g., one or more microprocessors, microcontrollers, Digital Signal Processors (DSPs), Field Programmable Gate Arrays (FPGAs). Complex Programmable Logic Devices (CPLDs), Application Specific Integrated Circuits (ASICs), or any mix thereof. More generally, the processing circuitry 52 may comprise fixed circuitry, or programmable circuitry that is specially adapted via the execution of program instructions implementing the functionality taught herein or may comprise some mix of fixed and programmed circuitry. The processing circuitry 52 may be multi-core.

The processing circuitry 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM. EEPROM, and FLASH memory, which may be in the processing circuitry 52 and/or separate from processing circuitry 52. The memory 64 may also store any configuration data 68 used by the wireless device 50. The processing circuitry 52 may be configured, e.g., through the use of appropriate program code stored in memory 64, to carry out one or more of the methods and/or signaling processes detailed herein.

The processing circuitry 52 of the wireless device 50 is configured, according to some embodiments, to cause the wireless device 50 to support connections to one or more serving cells in a first RAN, using a first RAT and to one or more serving cells in a second RAN, using a second RAT that differs from the first RAT. The processing circuitry 52 is configured to receive, e.g., from a base station in the second RAN, using the second RAT, one or more handover commands as part of a handover of the wireless device 50 to a base station in the first RAN, and to determine, based on the one or more handover commands, that the wireless device is to revert from a currently configured Packet Data Convergence Protocol (PDCP) configuration to a PDCP configuration associated with the first RAT. In some embodiments, this determining may be based on a determination that that the one or more handover commands include an indication that a full configuration should be used. The processing circuitry 52 is further configured to revert to the PDCP configuration associated with the first RAT, in response to this determining.

Figure 7:
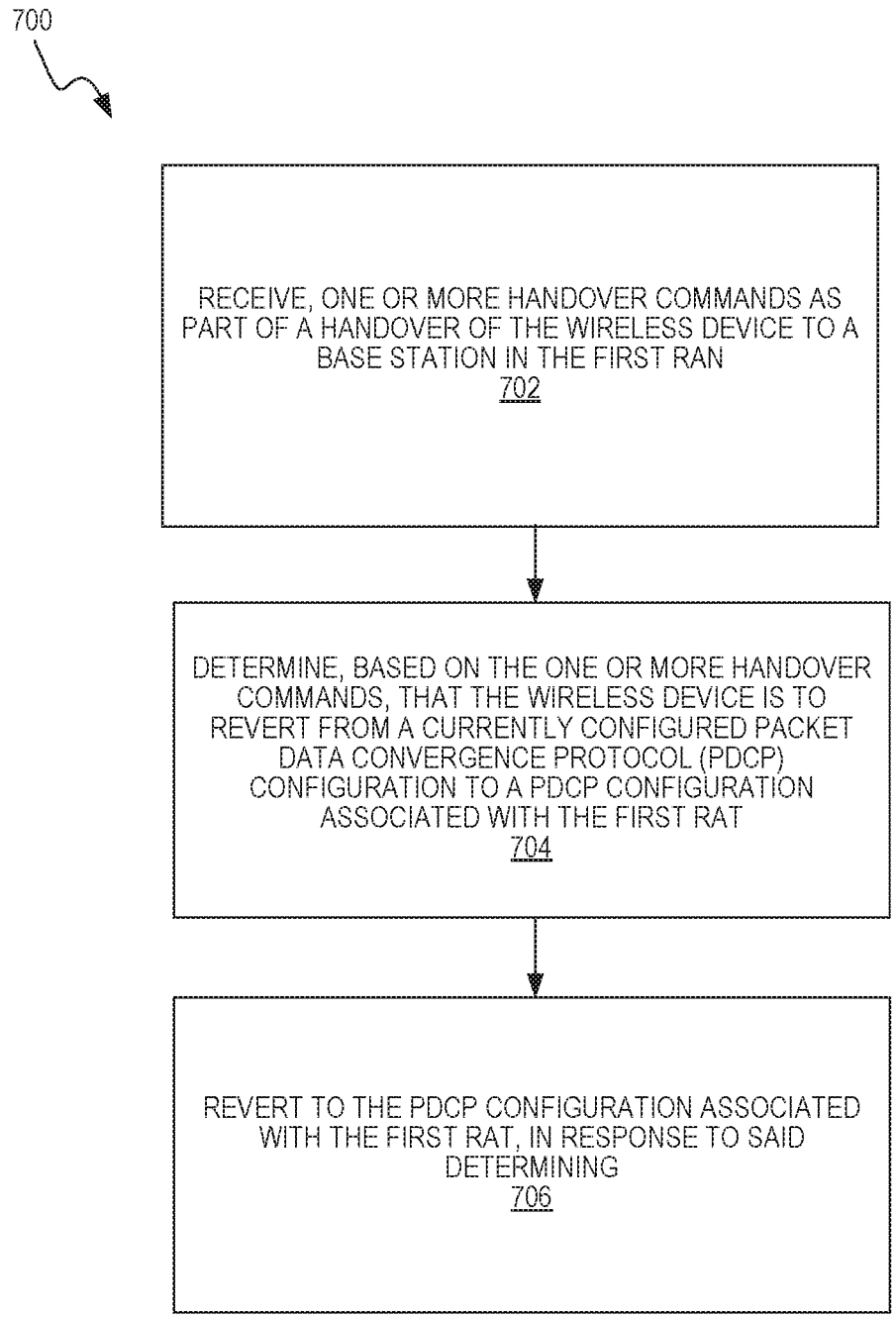
FIG. 7 illustrates a flow diagram of a method by the wireless device, according to some embodiments.

According to some embodiments, the processing circuitry 52 is configured to perform a method 700, as shown in FIG. 7. The method 700 includes receiving one or more handover commands as part of a handover of the wireless device to a base station in the first RAN, as shown at block 702. These may be received from a base station in the second RAN, using the second RAT, in some embodiments. The method 700 further includes determining, based on the one or more handover commands, that the wireless device is to revert from a currently configured Packet Data Convergence Protocol (PDCP) configuration to a PDCP configuration associated with the first RAT, as shown at block 704. This may be based on a determination that the one or more handover commands include an indication that a full configuration should be used, for example. The method 700 still further includes reverting to the PDCP configuration associated with the first RAT, in response to said determining, as shown at block 706.

In some embodiments of the method shown in FIG. 7, the first RAT is Evolved Universal Terrestrial Radio Access (E-UTRA) and the second RAT is New Radio (NR). The one or more handover commands may comprise a Radio Resource Configuration (RRC) connection reconfiguration message.

In some embodiments, determining that the wireless device is to revert from the currently configured PDCP configuration to the PDCP configuration associated with the first RAT is based on a determination that at least one of the following applies:
  the one or more handover commands include an indication that a full configuration should be used;
  the one or more handover commands lack any embedded NR RRC information;
  the one or more handover commands include SRB1 in an SRB add or modify information element;
  System Information broadcast by the target cell, as identified by the one or more handover commands, does not include any indication that the second RAT is supported or that dual connectivity involving the second RAT is supported;
  the one or more handover commands do not include a Secondary Cell Group configuration for the second RAT.

In some embodiments, reverting to the PDCP configuration associated with the first RAT comprises applying a default PDCP and/or Radio Link Control (RLC) and/or Medium Access Control (MAC) configuration for the first RAT. In some of these embodiments, the method further comprises receiving an indication or identification of the default PDCP and/or Radio Link Control RLC and/or MAC configuration via a system information broadcast or via dedicated signaling (not shown in FIG. 7).

In some embodiments, reverting to the PDCP configuration associated with the first RAT comprises performing a security key derivation procedure using key derivation procedures for the first RAT. In some of these and in some other embodiments, reverting to the PDCP configuration associated with the first RAT comprises changing one or more security algorithms for integrity protection and/or ciphering of SRBs or DRBs to security algorithm(s) for the first RAT. In some of these latter embodiments may further include receiving an indication or identification of the security algorithm(s) for the first RAT via dedicated signaling from the base station in the second RAN. Alternatively, some of these embodiments may include a step of identifying the security algorithm(s) for the first RAT based on a mapping from corresponding security algorithm(s) used in the base station in the second RAN.

Figure 8:
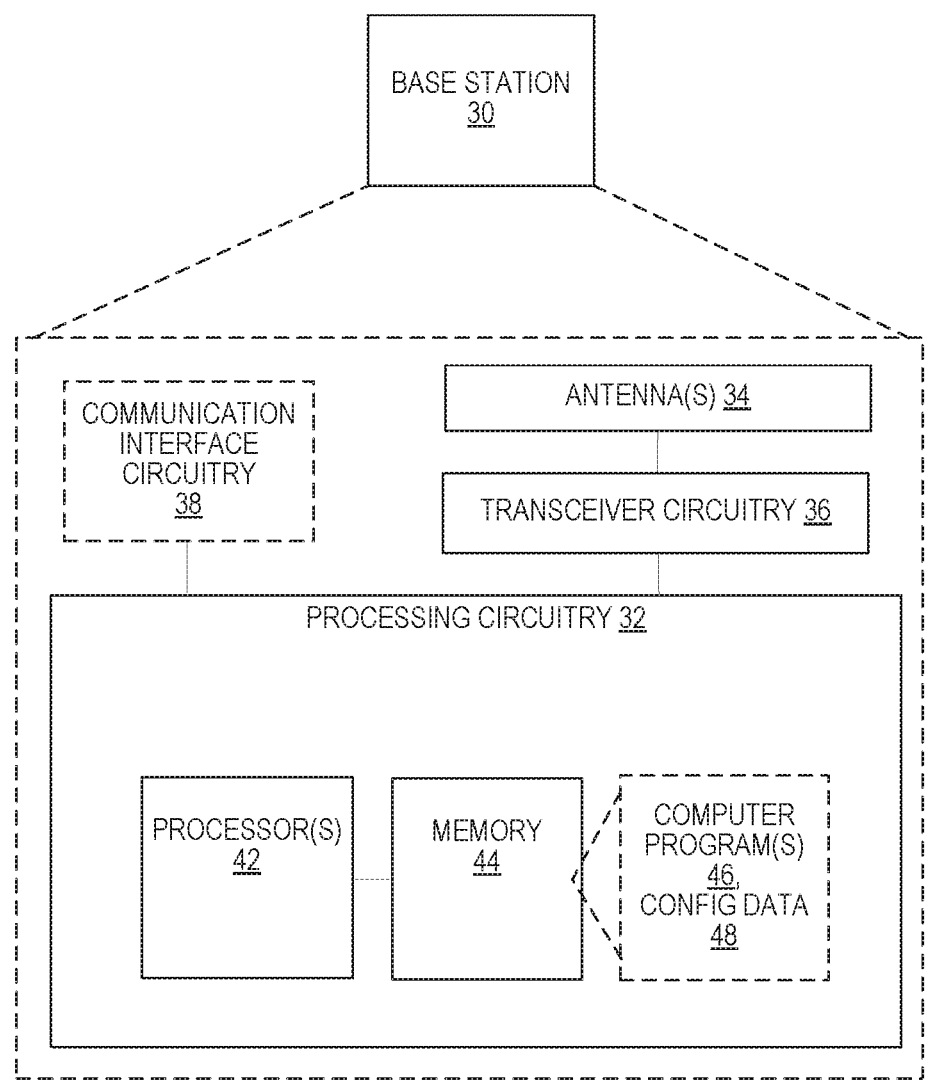
FIG. 8 is a block diagram of a network node, according to some embodiments.

In some embodiments, reverting to the PDCP configuration associated with the first RAT comprises re-establishing PDCP and/or RLC and/or MAC entities in the wireless device for signaling radio bearers (SRBs) and data radio bearers (DRBs) prior to transmitting to the base station in the first RAN. This may comprise, for example, discarding packets not yet acknowledged by a peer protocol entity, informing higher layers that packets have been discarded, and/or re-setting sequence or packet counters Correspondingly, FIG. 8 illustrates a diagram of a base station, shown as base station 30, that may be configured to carry out one or more of the disclosed techniques from the perspective of the base station. The base station may be an evolved Node B (eNodeB), Node B or gNB. While a base station is shown in FIG. 8, the base station operations can be performed by other kinds of network access nodes or relay nodes. In the non-limiting embodiments described below, the base station 30 will be described as being configured to operate as a cellular network access node in an LTE network or NR network.

Those skilled in the art will readily appreciate how each type of node may be adapted to carry out one or more of the methods and signaling processes described herein, e.g., through the modification of and/or addition of appropriate program instructions for execution by processing circuits 32.

The base station 30 facilitates communication between wireless terminals, other network access nodes and/or the core network. The base station 30 may include communication interface circuitry 38 that includes circuitry for communicating with other nodes in the core network, radio nodes, and/or other types of nodes in the network for the purposes of providing data and/or cellular communication services. The base station 30 communicates with wireless devices using antennas 34 and transceiver circuitry 36. The transceiver circuitry 36 may include transmitter circuits, receiver circuits, and associated control circuits that are collectively configured to transmit and receive signals according to a radio access technology, for the purposes of providing cellular communication services.

The base station 30 also includes one or more processing circuits 32 that are operatively associated with the transceiver circuitry 36 and, in some cases, the communication interface circuitry 38. The processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuitry 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM. DRAM, EEPROM, and FLASH memory, which may be in the processing circuitry 32 and/or separate from the processing circuitry 32. The memory 44 may also store any configuration data 48 used by the network access node 30. The processing circuitry 32 may be configured. e.g., through the use of appropriate program code stored in memory 44, to carry out one or more of the methods and/or signaling processes detailed hereinafter.

The processing circuitry 32 of the base station 30 is configured, according to some embodiments, to operate as a base station in a second radio access network (RAN), where the base station is configured to support connections by a wireless device to the base station using a second radio access technology (RAT) and to one or more serving cells in a first RAN using a first RAT that differs from the second RAT. The processing circuitry 32 in some of these embodiments is configured to determine that a target base station for handover of the wireless device is a base station in the first RAN that does not support the second RAT; and refrain from passing access stratum (AS) context information to the target base station as part of the handover of the wireless device, to the target base station. The first RAT may be LTE (i.e., the first RAN is E-UTRAN), and the second RAT may be NR, in some embodiments.

The processing circuitry 32 of the base station 30 may also be configured to perform a method 900, such as by a base station in a second RAN, where the base station is configured to support connections by a wireless device to the base station using a second RAT and to one or more serving cells in a first RAN using a first RAT that differs from the second RAT. The method 900 includes determining that a target base station for handover of the wireless device is a base station in the first RAN that does not support the second RAT, as shown at block 902, and refraining from passing access stratum (AS) context information to the target base station as part of the handover of the wireless device to the target base station, as shown at block 904. The method may include, in some embodiments, identifying one or more security algorithms for encryption and integrity protection for the first RAT and signaling the identified security algorithm(s) to the wireless device.

The processing circuitry 32 of the base station 30 is configured, according to other embodiments, to operate as a base station in a first RAN using a first RAT. The processing circuitry 32 in some of these embodiments is configured to receive handover information for a wireless device from a source base station in a second RAN that uses a second RAT, wherein the handover information for the wireless device does not include access stratum (AS) context information for the second RAT or includes AS context information that is not understood by the base station. The processing circuit 32 in these embodiments is further configured to initiate a full wireless device configuration and include a full configuration indication in a handover command sent to the wireless device. The first RAT may be LTE (i.e., the first RAN is E-UTRAN), and the second RAT may be NR, in some embodiments. The handover command may be a Radio Resource Control (RRC) connection reconfiguration message.

Figure 10:
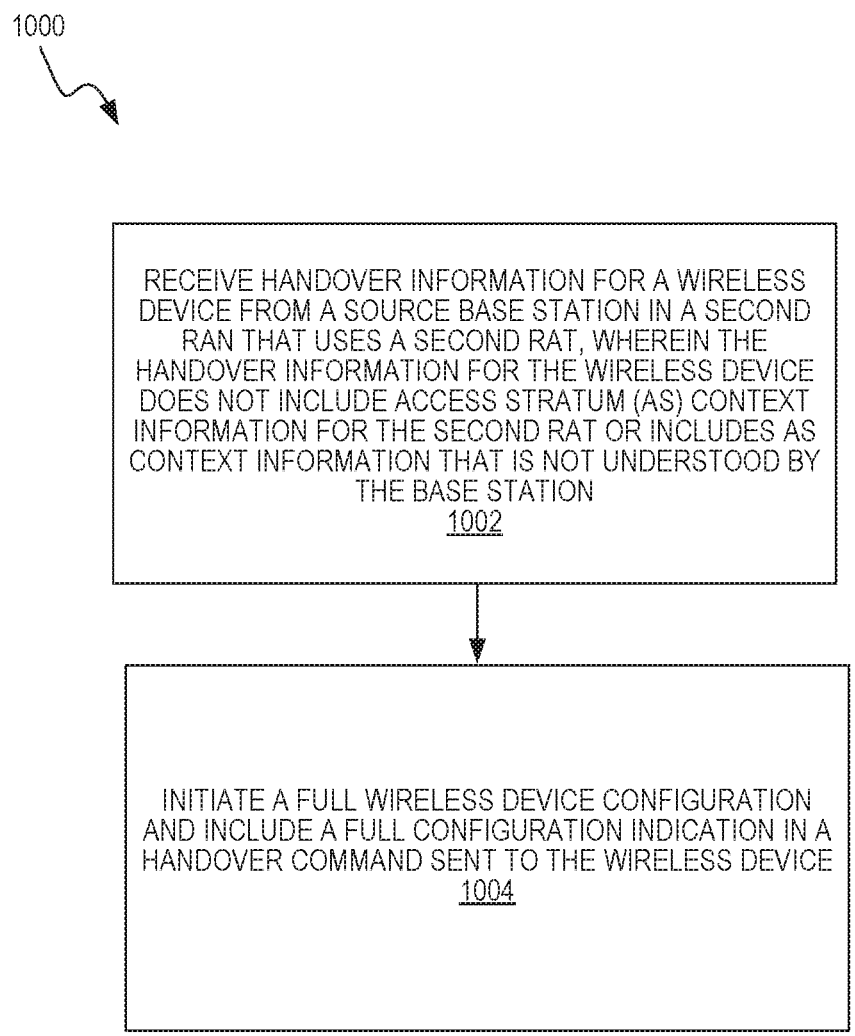
FIG. 10 illustrates a flow diagram of another method by the network node, according to some embodiments.

Thus, the processing circuitry 32 of the base station 30 may be configured to perform a method 1000 as illustrated in FIG. 10, where the method comprises, as shown at block 1002, receiving handover information for a wireless device from a source base station in a second RAN that uses a second RAT, wherein the handover information for the wireless device does not include access stratum (AS) context information for the second RAT or includes AS context information that is not understood by the base station. The method 1000 further comprises initiating a full wireless device configuration and including a full configuration indication in a handover command sent to the wireless device, as shown at block 1004.

Figure 11:
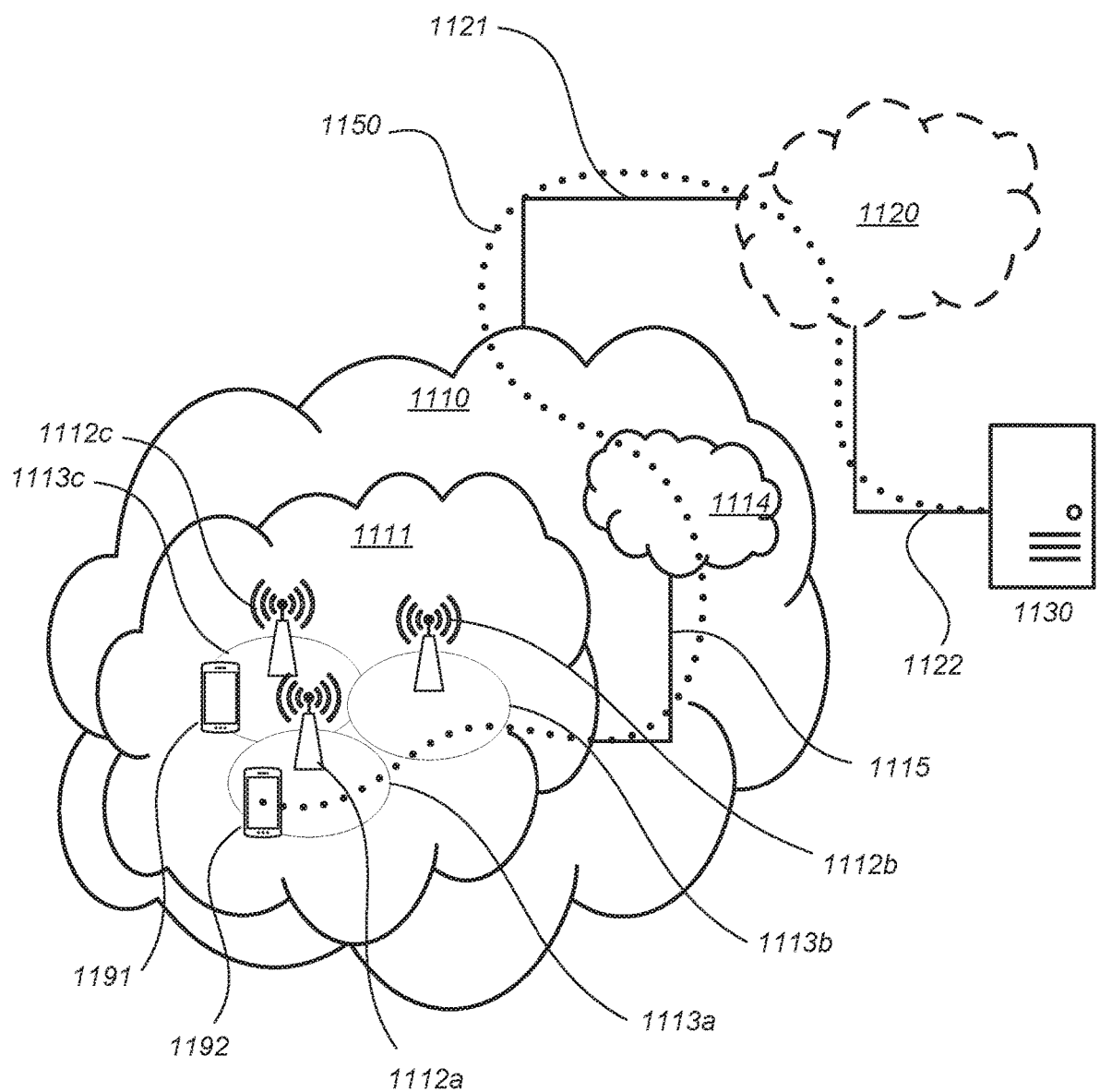
FIG. 11 schematically illustrates a telecommunication network connected via an intermediate network to a host computer, according to some embodiments.

FIG. 11, according to some embodiments, illustrates a communication system that includes a telecommunication network 1110, such as a 3GPP-type cellular network, which comprises an access network 1111, such as a radio access network, and a core network 1114. The access network 1111 comprises a plurality of base stations 1112a, 1112b, 1112c, such as NBs. eNBs, gNBs or other types of wireless access points, each defining a corresponding coverage area 1113a, 1113b, 1113c. Each base station 1112a, 1112b. 1112c is connectable to the core network 1114 over a wired or wireless connection 1115. A first user equipment (UE) 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

The telecommunication network 1110 is itself connected to a host computer 1130, which may be embodied in the hardware and/or software of a standalone server, a cloud-implemented server, a distributed server or as processing resources in a server farm. The host computer 1130 may be under the ownership or control of a service provider, or may be operated by the service provider or on behalf of the service provider. The connections 1121, 1122 between the telecommunication network 1110 and the host computer 1130 may extend directly from the core network 1114 to the host computer 1130 or may go via an optional intermediate network 1120. The intermediate network 1120 may be one of, or a combination of more than one of, a public, private or hosted network; the intermediate network 1120, if any, may be a backbone network or the Internet; in particular, the intermediate network 1120 may comprise two or more sub-networks (not shown).

The communication system of FIG. 11 as a whole enables connectivity between one of the connected UEs 1191, 1192 and the host computer 1130. The connectivity may be described as an over-the-top (OTT) connection 1150. The host computer 1130 and the connected UEs 1191, 1192 are configured to communicate data and/or signaling via the OTT connection 1150, using the access network 1111, the core network 1114, any intermediate network 1120 and possible further infrastructure (not shown) as intermediaries. The OTT connection 1150 may be transparent in the sense that the participating communication devices through which the OTT connection 1150 passes are unaware of routing of uplink and downlink communications. For example, a base station 1112 may not or need not be informed about the past routing of an incoming downlink communication with data originating from a host computer 1130 to be forwarded (e.g., handed over) to a connected UE 1191. Similarly, the base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In a communication system 1200, a host computer 1210 comprises hardware 1215 including a communication interface 1216 configured to set up and maintain a wired or wireless connection with an interface of a different communication device of the communication system 1200. The host computer 1210 further comprises processing circuitry 1218, which may have storage and/or processing capabilities. In particular, the processing circuitry 1218 may comprise one or more programmable processors, application-specific integrated circuits, field programmable gate arrays or combinations of these (not shown) adapted to execute instructions. The host computer 1210 further comprises software 1211, which is stored in or accessible by the host computer 1210 and executable by the processing circuitry 1218. The software 1211 includes a host application 1212. The host application 1212 may be operable to provide a service to a remote user, such as a UE 1230 connecting via an OTT connection 1250 terminating at the UE 1230 and the host computer 1210. In providing the service to the remote user, the host application 1212 may provide user data which is transmitted using the OTT connection 1250.

The communication system 1200 further includes a base station 1220 provided in a telecommunication system and comprising hardware 1225 enabling it to communicate with the host computer 1210 and with the UE 1230. The hardware 1225 may include a communication interface 1226 for setting up and maintaining a wired or wireless connection with an interface of a different communication device of the communication system 1200, as well as a radio interface 1227 for setting up and maintaining at least a wireless connection 1270 with a UE 1230 located in a coverage area (not shown in FIG. 12) served by the base station 1220. The communication interface 1226 may be configured to facilitate a connection 1260 to the host computer 1210. The connection 1260 may be direct or it may pass through a core network (not shown in FIG. 12) of the telecommunication system and/or through one or more intermediate networks outside the telecommunication system. In the embodiment shown, the hardware 1225 of the base station 1220 further includes processing circuitry 1228, which may comprise one or more programmable processors, application-specific integrated circuits, field programmable gate arrays or combinations of these (not shown) adapted to execute instructions. The base station 1220 further has software 1221 stored internally or accessible via an external connection.

The communication system 1200 further includes the UE 1230 already referred to. Its hardware 1235 may include a radio interface 1237 configured to set up and maintain a wireless connection 1270 with a base station serving a coverage area in which the UE 1230 is currently located. The hardware 1235 of the UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by the UE 1230 and executable by the processing circuitry 1238. The software 1231 includes a client application 1232. The client application 1232 may be operable to provide a service to a human or non-human user via the UE 1230, with the support of the host computer 1210. In the host computer 1210, an executing host application 1212 may communicate with the executing client application 1232 via the OTT connection 1250 terminating at the UE 1230 and the host computer 1210. In providing the service to the user, the client application 1232 may receive request data from the host application 1212 and provide user data in response to the request data. The OTT connection 1250 may transfer both the request data and the user data. The client application 1232 may interact with the user to generate the user data that it provides.

Figure 12:
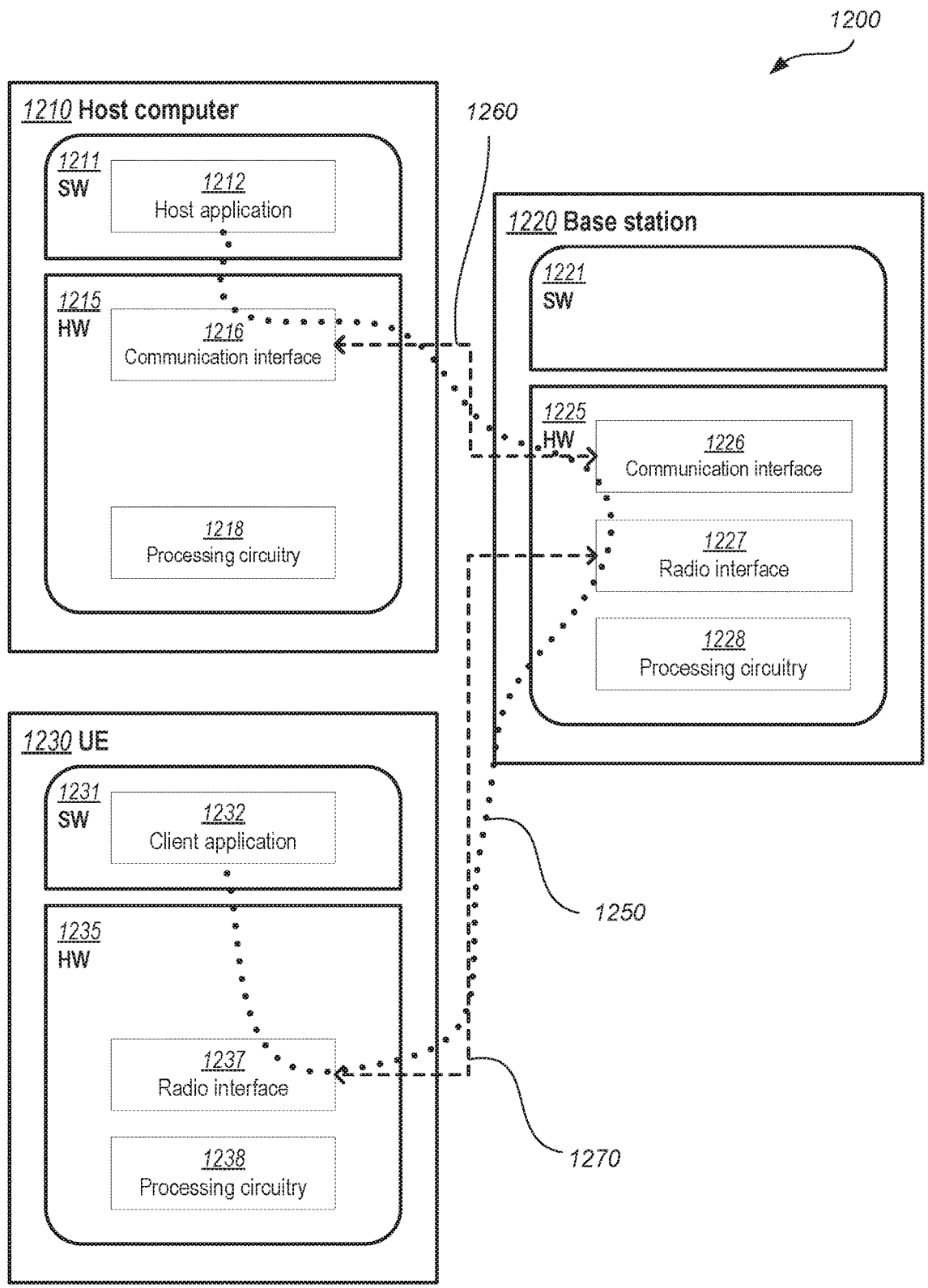
FIG. 12 is a generalized block diagram of a host computer communicating via a base station with a user equipment over a partially wireless connection, according to some embodiments.

It is noted that the host computer 1210, base station 1220 and UE 1230 illustrated in FIG. 12 may be identical to the host computer 1130, one of the base stations 1112a, 1112b, 1112c and one of the UEs 1191, 1192 of FIG. 11, respectively. This is to say, the inner workings of these entities may be as shown in FIG. 12 and independently, the surrounding network topology may be that of FIG. 11.

In FIG. 12, the OTT connection 1250 has been drawn abstractly to illustrate the communication between the host computer 1210 and the use equipment 1230 via the base station 1220, without explicit reference to any intermediary devices and the precise muting of messages via these devices. Network infrastructure may determine the routing, which it may be configured to hide from the UE 1230 or from the service provider operating the host computer 1210, or both. While the OTT connection 1250 is active, the network infrastructure may further take decisions by which it dynamically changes the routing (e.g., on the basis of load balancing consideration or reconfiguration of the network).

The wireless connection 1270 between the UE 1230 and the base station 1220 is in accordance with the teachings of the embodiments described throughout this disclosure, such as provided for wireless device 50 and base station 30, along with the corresponding methods 700, 900, and 1000. The various embodiments described herein allow for the support of handover scenarios where the wireless device starts with an SRB1 configured with NR PDCP but the target base station doesn't support NR. Supporting such handover scenarios minimizes service interruption compared to solutions where the whole RRC connection has to be re-established in the target node. More precisely, the teachings of these embodiments may improve the data rate, capacity, latency and/or power consumption for the network and UE 1230 using the OTT connection 1250 and thereby provide benefits such as reduced user waiting time, relaxed restriction on file size, more capacity, better responsiveness, and better device battery time.

A measurement procedure may be provided for the purpose of monitoring data rate, latency and other factors on which the one or more embodiments improve. There may further be an optional network functionality for reconfiguring the OTT connection 1250 between the host computer 1210 and UE 1230, in response to variations in the measurement results. The measurement procedure and/or the network functionality for reconfiguring the OTT connection 1250 may be implemented in the software 1211 of the host computer 1210 or in the software 1231 of the UE 1230, or both. In embodiments, sensors (not shown) may be deployed in or in association with communication devices through which the OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of the OTT connection 1250 may include message format, retransmission settings, preferred routing etc.; the reconfiguring need not affect the base station 1220, and it may be unknown or imperceptible to the base station 1220. Such procedures and functionalities may be known and practiced in the art. In certain embodiments, measurements may involve proprietary UE signaling facilitating the host computer's 1210 measurements of throughput, propagation times, latency and the like. The measurements may be implemented in that the software 1211, 1231 causes messages to be transmitted, in particular empty or 'dummy' messages, using the OTT connection 1250 while it monitors propagation times, errors etc.

Figure 13:
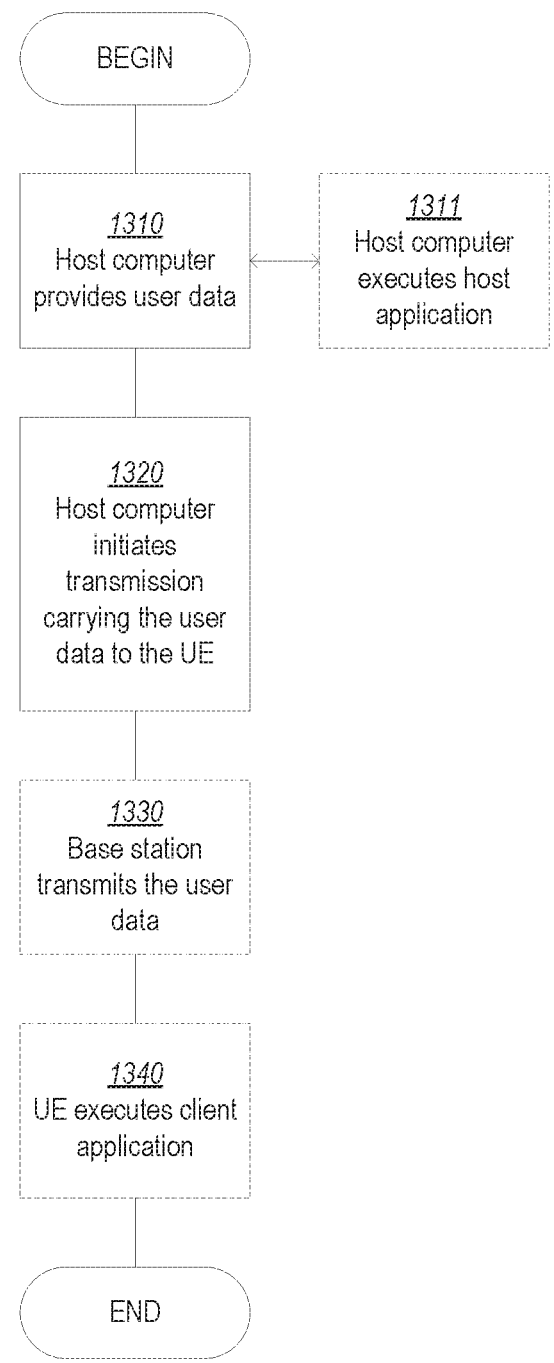
FIGS. 13 to 16 are flowcharts illustrating example methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In a first step 1310 of the method, the host computer provides user data. In an optional substep 1311 of the first step 1310, the host computer provides the user data by executing a host application. In a second step 1320, the host computer initiates a transmission carrying the user data to the UE. In an optional third step 1330, the base station transmits to the UE the user data which was carried in the transmission that the host computer initiated, in accordance with the teachings of the embodiments described throughout this disclosure. In an optional fourth step 1340, the UE executes a client application associated with the host application executed by the host computer.

Figure 14:
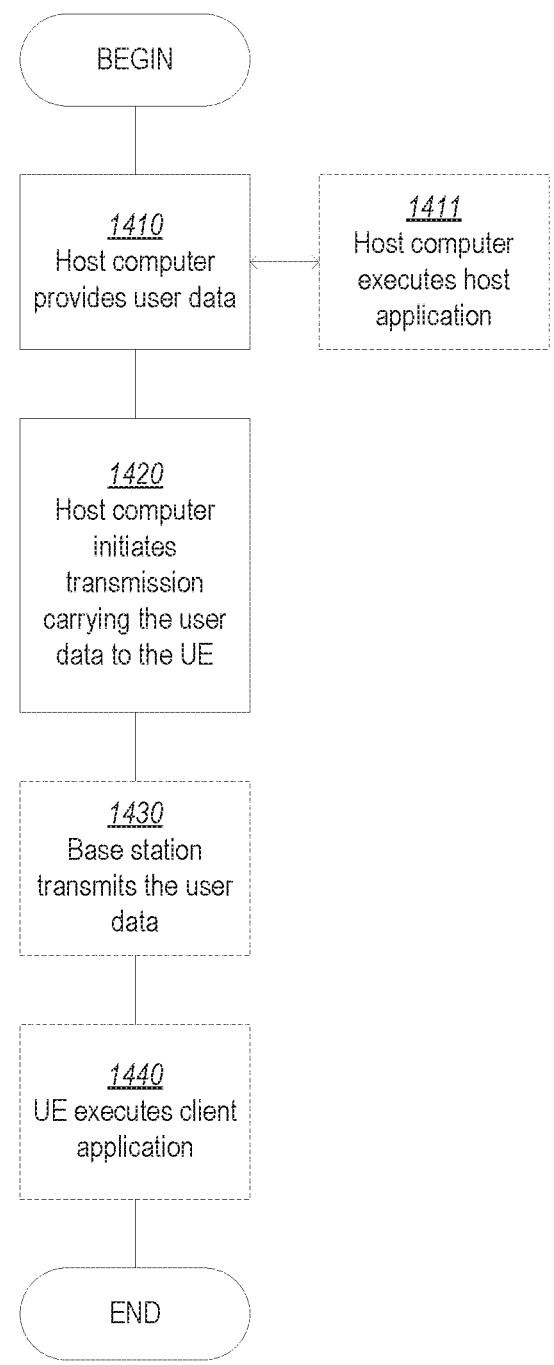

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In a first step 1410 of the method, the host computer provides user data. In an optional substep (block 1411) the host computer provides the user data by executing a host application. In a second step 1420, the host computer initiates a transmission carrying the user data to the UE. The transmission may pass via the base station, in accordance with the teachings of the embodiments described throughout this disclosure. In an optional third step 1430, the UE receives the user data carried in the transmission.

Figure 15:
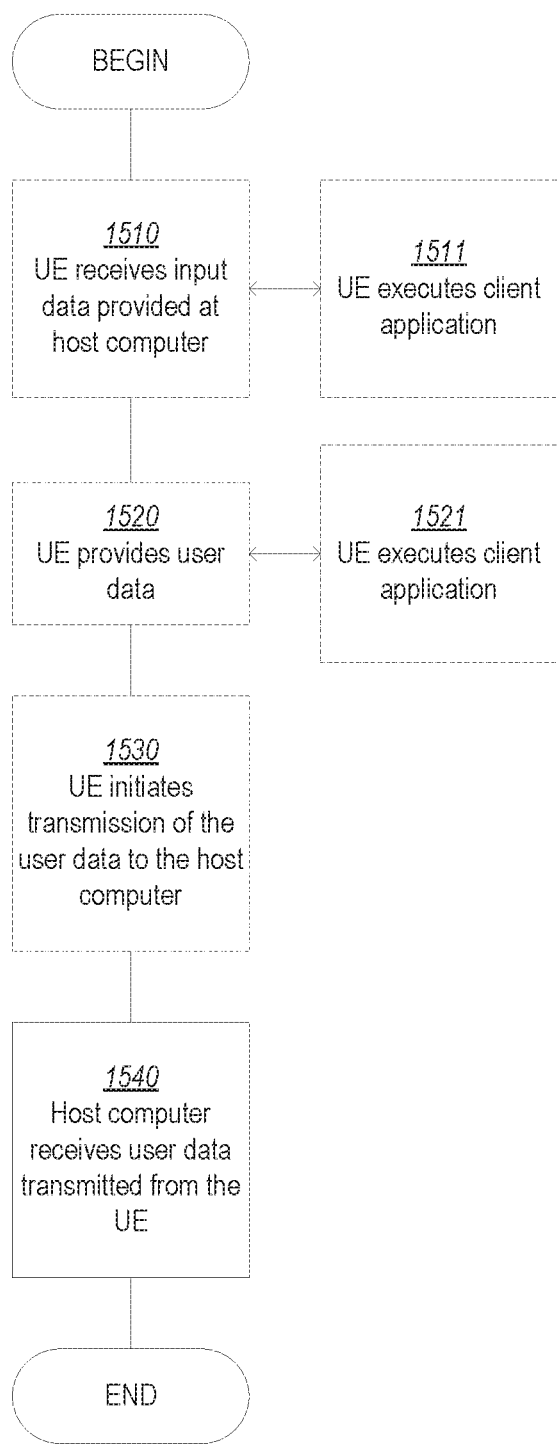

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 12 will be included in this section. In an optional first step 1510 of the method, the UE receives input data provided by the host computer. Additionally or alternatively, in an optional second step 1520, the UE provides user data. In an optional substep 1521 of the second step 1520, the UE provides the user data by executing a client application. In a further optional substep 1511 of the first step 1510, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1530, transmission of the user data to the host computer. In a fourth step 1540 of the method, the host computer receives the user data transmitted from the UE, in accordance with the teachings of the embodiments described throughout this disclosure.

Figure 16:
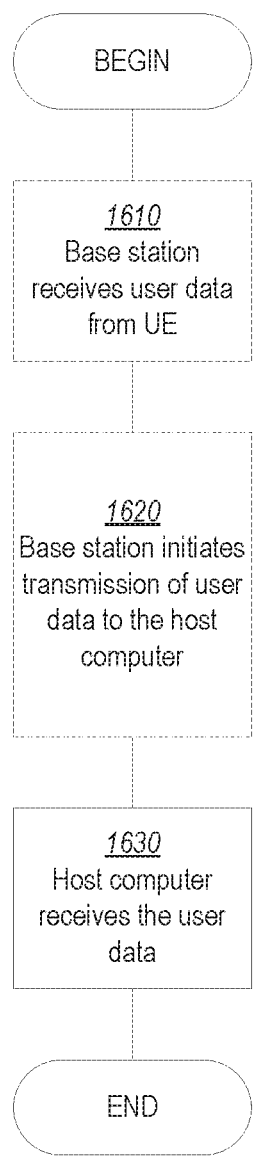

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In an optional first step 1610 of the method, in accordance with the teachings of the embodiments described throughout this disclosure, the base station receives user data from the UE. In an optional second step 1620, the base station initiates transmission of the received user data to the host computer. In a third step 1360, the host computer receives the user data carried in the transmission initiated by the base station.

Figure 9:
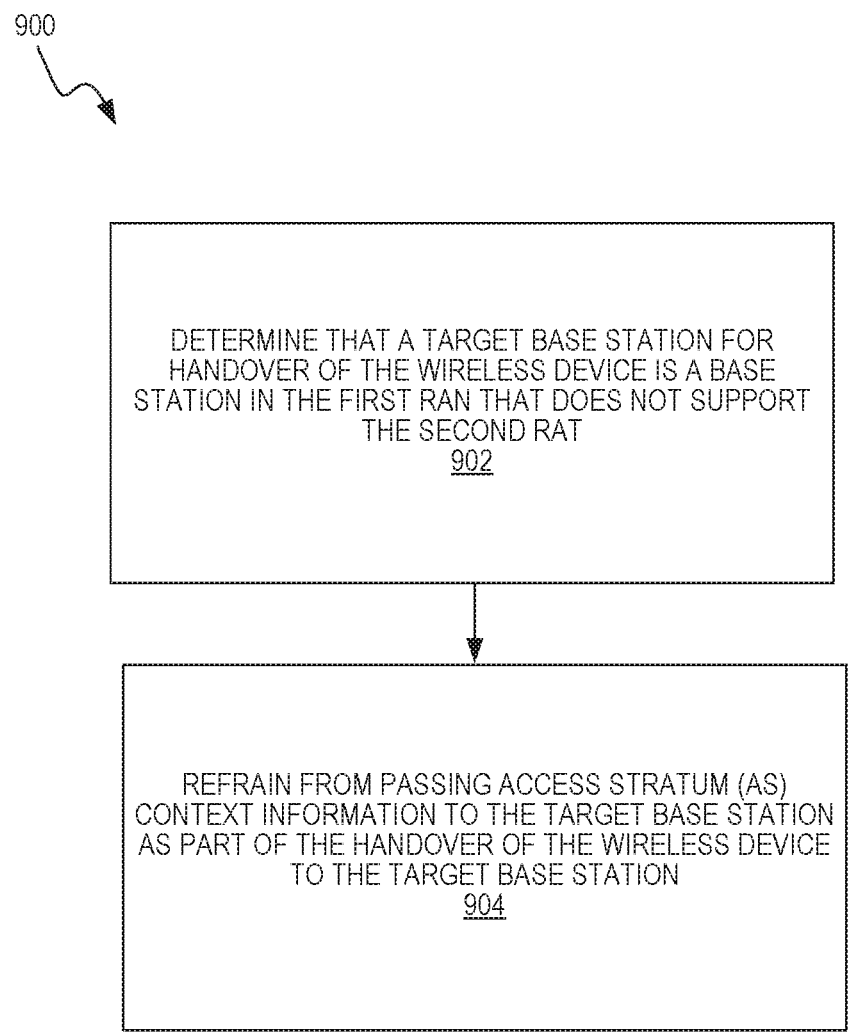
FIG. 9 illustrates a flow diagram of a method by the network node, according to some embodiments.

As discussed in detail above, the techniques described herein, e.g., as illustrated in the process flow diagrams of FIGS. 7, 9, and 10, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

EXAMPLE EMBODIMENTS

Example embodiments can include, but are not limited to, the following enumerated examples:

1. A method, in a wireless device configured to support connections to one or more serving cells in a first radio access network (RAN), using a first radio access technology (RAT) and to one or more serving cells in a second RAN, using a second RAT that differs from the first RAT, the method comprising:
    receiving, e.g. from a base station in the second RAN using the second RAT, one or more handover commands as part of a handover of the wireless device to a base station in the first RAN;
    determining, based on the one or more handover commands, that the wireless device is to revert from a currently configured Packet Data Convergence Protocol (PDCP) configuration to a PDCP configuration associated with the first RAT; and
    reverting to the PDCP configuration associated with the first RAT, in response to said determining.

2. The method of example embodiment 1, wherein the first RAT is Evolved Universal Terrestrial Radio Access (E-UTRA) and the second RAT is New Radio (NR).

3. The method of example embodiment 1 or 2, wherein the one or more handover commands comprise a Radio Resource Configuration (RRC) connection reconfiguration message.

4. The method of any example embodiments 1-3, wherein determining that the wireless device is to revert from the currently configured PDCP configuration to the PDCP configuration associated with the first RAT is based on a determination that at least one of the following applies:
    the one or more handover commands include an indication that a full configuration should be used;

the one or more handover commands lack any embedded NR RRC information;

the one or more handover commands include SRB1 in an SRB add or modify information element;

System Information broadcast by the target cell, as identified by the one or more handover commands, does not include any indication that the second RAT is supported or that dual connectivity involving the second RAT is supported;

the one or more handover commands do not include a Secondary Cell Group configuration for the second RAT.

5. The method of any of example embodiments 1-4, wherein reverting to the PDCP configuration associated with the first RAT comprises applying a default PDCP and/or Radio Link Control (RLC) and/or Medium Access Control (MAC) configuration for the first RAT.

6. The method of example embodiment 5, wherein the method further comprises receiving an indication or identification of the default PDCP and/or Radio Link Control RLC and/or MAC configuration via a system information broadcast or via dedicated signaling.

7. The method of any of example embodiments 1-6, wherein reverting to the PDCP configuration associated with the first RAT comprises performing a security key derivation procedure using key derivation procedures for the first RAT.

8. The method of any of example embodiments 1-7, wherein reverting to the PDCP configuration associated with the first RAT comprises changing one or more security algorithms for integrity protection and/or ciphering of SRBs or DRBs to security algorithm(s) for the first RAT.

9. The method of example embodiment 8, wherein the method further comprises receiving an indication or identification of the security algorithm(s) for the first RAT via dedicated signaling from the base station in the second RAN.

10. The method of example embodiment 8, wherein the method further comprises identifying the security algorithm(s) for the first RAT based on a mapping from corresponding security algorithm(s) used in the base station in the second RAN.

11. The method of any of example embodiments 1-10, wherein reverting to the PDCP configuration associated with the first RAT comprises re-establishing PDCP and/or RLC and/or MAC entities in the wireless device for signaling radio bearers (SRBs) and data radio bearers (DRBs) prior to transmitting to the base station in the first RAN.

12. The method of example embodiment 11, wherein said re-establishing comprises one or more of:

discarding packets not yet acknowledged by a peer protocol entity;

informing higher layers that packets have been discarded; and/or re-setting sequence or packet counters.

13. A method, in a user equipment (UE) for performing handover, the method comprising:

receiving a handover command while operating with a Signaling Radio Bearer 1 (SRB1) configured with New Radio (NR) Packet Data Convergence Protocol (PDCP), the handover command including an indication that full configuration should be used; and reverting to Long Term Evolution (LTE) PDCP configuration for SRB1 responsive to determining that the handover command includes the indication that full configuration should be used.

14. The method of embodiment 13, wherein reverting to LTE PDCP configuration for SRB1 comprises changing one or more security algorithms for integrity protection and/or ciphering of SRBs or DRBs to security algorithm(s) for LTE and identifying the security algorithm(s) for LTE based on a mapping from corresponding security algorithm(s) used while operating with the SRB1 configured with NR PDCP.

15. A method, in a base station in a second radio access network (RAN), wherein the base station is configured to support connections by a wireless device to the base station using a second radio access technology (RAT) and to one or more serving cells in a first RAN using a first RAT that differs from the second RAT, the method comprising:

determining that a target base station for handover of the wireless device is a base station in the first RAN that does not support the second RAT; and refraining from passing access stratum (AS) context information to the target base station as part of the handover of the wireless device to the target base station.

16. A method, in a base station in a first radio access network (RAN) using a first RAT, the method comprising:

receiving handover information for a wireless device from a source base station in a second RAN that uses a second RAT, wherein the handover information for the wireless device does not include access stratum (AS) context information for the second RAT or includes AS context information that is not understood by the base station; and initiating a full wireless device configuration and including a full configuration indication in a handover command sent to the wireless device.

17. The method of example embodiment 16, wherein the handover command is a Radio Resource Control (RRC) connection reconfiguration message.

18. The method of any of example embodiments 15-17, wherein the first RAT is Evolved Universal Terrestrial Radio Access (E-UTRA) and the second RAT is New Radio (NR).

19. The method of any of example embodiments 15-18, wherein the method further comprises identifying one or more security algorithms for encryption and integrity protection for the first RAT and signaling the identified security algorithm(s) to the wireless device.

20. A wireless device configured to support connections to one or more serving cells in a first radio access network (RAN), using a first radio access technology (RAT) and to one or more serving cells in a second RAN, using a second RAT that differs from the first RAT, the wireless device comprising:

transceiver circuitry configured for communicating with the serving cells in the first and second RANs; and processing circuitry operatively associated with the transceiver circuitry and configured to:

receive, e.g. from a base station in the second RAN using the second RAT, one or more handover commands as part of a handover of the wireless device to a base station in the first RAN;

determine, based on the one or more handover commands, that the wireless device is to revert from a currently configured Packet Data Convergence Protocol (PDCP) configuration to a PDCP configuration associated with the first RAT: and revert to the PDCP configuration associated with the first RAT, in response to said determining.

21. The wireless device of example embodiment 20, wherein the first RAT is Evolved Universal Terrestrial Radio Access (E-UTRA) and the second RAT is New Radio (NR).

22. The method of example embodiment 20 or 21, wherein the one or more handover commands comprise a Radio Resource Configuration (RRC) connection reconfiguration message.

23. The wireless device of any example embodiments 20-22, wherein the processing circuitry is configured to determine that the wireless device is to revert from the currently configured PDCP configuration to the PDCP configuration associated with the first RAT based on a determination that at least one of the following applies:
   the one or more handover commands include an indication that a full configuration should be used;
   the one or more handover commands lack any embedded NR RRC information;
   the one or more handover commands include SRB1 in an SRB add or modify information element;
   System Information broadcast by the target cell, as identified by the one or more handover commands, does not include any indication that the second RAT is supported or that dual connectivity involving the second RAT is supported;
   the one or more handover commands do not include a Secondary Cell Group configuration for the second RAT.

24. The wireless device of any of example embodiments 20-23, wherein the processing circuitry is configured to revert to the PDCP configuration associated with the first RAT by applying a default PDCP and/or Radio Link Control (RLC) and/or Medium Access Control (MAC) configuration for the first RAT.

25. The wireless device of example embodiment 24, wherein the processing circuitry is further configured to receive an indication or identification of the default PDCP and/or Radio Link Control RLC and/or MAC configuration via a system information broadcast or via dedicated signaling.

26. The wireless device of any of example embodiments 20-25, wherein the processing circuitry is configured to revert to the PDCP configuration associated with the first RAT by performing a security key derivation procedure using key derivation procedures for the first RAT.

27. The wireless device of any of example embodiments 20-26, wherein the processing circuitry is configured to revert to the PDCP configuration associated with the first RAT by changing one or more security algorithms for integrity protection and/or ciphering of SRBs or DRBs to security algorithm(s) for the first RAT.

28. The wireless device of example embodiment 27, wherein the processing circuitry is further configured to receive an indication or identification of the security algorithm(s) for the first RAT via dedicated signaling from the base station in the second RAN.

29. The wireless device of example embodiment 27, wherein the processing circuitry is configured to identify the security algorithm(s) for the first RAT based on a mapping from corresponding security algorithm(s) used in the base station in the second RAN.

30. The wireless device of any of example embodiments 20-29, wherein the processing circuitry is configured to revert to the PDCP configuration associated with the first RAT by re-establishing PDCP and/or RLC and/or MAC entities in the wireless device for signaling radio bearers (SRBs) and data radio bearers (DRBs) prior to transmitting to the base station in the first RAN.

31. The wireless device of example embodiment 30, wherein the processing circuitry is configured to, as part of said re-establishing, perform one or more of:
   discarding packets not yet acknowledged by a peer protocol entity;
   informing higher layers that packets have been discarded; and/or
   re-setting sequence or packet counters.

32. A user equipment (UE) configured to support connections to one or more serving cells in a Long Term Evolution (LTE) network and to one or more serving cells in a New Radio (NR) network, the UE comprising:
   transceiver circuitry configured for communicating with the serving cells in the LTE and NR networks: and
   processing circuitry operatively associated with the transceiver circuitry and configured to:
      receive a handover command while operating with a Signaling Radio Bearer 1 (SRB1) configured with NR Packet Data Convergence Protocol. PDCP, the handover command including an indication that full configuration should be used; and
      revert to LTE PDCP configuration for SRB1 responsive to determining that the handover command includes the indication that full configuration should be used.

33. The UE of embodiment 32, wherein the processing circuitry is configured to revert to LTE PDCP configuration for SRB1 such that said reverting comprises changing one or more security algorithms for integrity protection and/or ciphering of SRBs or DRBs to security algorithm(s) for LTE and identifying the security algorithm(s) for LTE based on a mapping from corresponding security algorithm(s) used while operating with the SRB1 configured with NR PDCP.

34. A base station for use in a second radio access network (RAN), wherein the base station is configured to support connections by a wireless device to the base station using a second radio access technology (RAT) and to one or more serving cells in a first RAN using a first RAT that differs from the second RAT, the base station comprising:
   communication circuitry configured to communicate with the serving cells in the first RAN;
   transceiver circuitry configured to communicate with the wireless device, using the second RAT; and
   processing circuitry operatively associated with the communication circuitry and transceiver circuitry and configured to:
      determine that a target base station for handover of the wireless device is a base station in the first RAN that does not support the second RAT: and
      refrain from passing access stratum (AS) context information to the target base station as part of the handover of the wireless device to the target base station.

35. A base station for use in a first radio access network (RAN) using a first RAT, the base station comprising:
   communication circuitry configured to communicate with one or more base stations in a second RAN that uses a second RAT;
   transceiver circuitry configured to communicate with a wireless device served by the base station, using the first RAT; and processing circuitry operatively associated with the communication circuitry and transceiver circuitry and configured to:
      receive handover information for the wireless device from a source base station in the second RAN, via the communication circuitry, wherein the handover information for the wireless device does not include access stratum (AS) context information for the second RAT or includes AS context information that is not understood by the base station; and initiate a full wireless device configuration and include a full configuration indication in a handover command sent to the wireless device via the transceiver circuitry.

36. The base station of example embodiment 35, wherein the handover command is a Radio Resource Control (RRC) connection reconfiguration message.

37. The base station of any of example embodiments 34-36, wherein the first RAT is Evolved Universal Terrestrial Radio Access (E-UTRA) and the second RAT is New Radio (NR).

38. The base station of any of example embodiments 34-37, wherein the processing circuitry is further configured to identify one or more security algorithms for encryption and integrity protection for the first RAT and signal the identified security algorithm(s) to the wireless device, using the transceiver circuitry.

39. A non-transitory, computer-readable medium storing computer-executable instructions that, when executed by a processing circuit of a wireless device configured to support connections to one or more serving cells in a first radio access network (RAN), using a first radio access technology (RAT) and to one or more serving cells in a second RAN, using a second RAT that differs from the first RAT, cause the wireless device to:
  receive, from a base station in the second RAN, using the second RAT, one or more handover commands as part of a handover of the wireless device to a base station in the first RAN;
  determine based on the one or more handover commands, that the wireless device is to revert from a currently configured Packet Data Convergence Protocol (PDCP) configuration to a PDCP configuration associated with the first RAT;
  and revert to the PDCP configuration associated with the first RAT, in response to said determining.

40. A non-transitory, computer-readable medium storing computer-executable instructions that, when executed by a processing circuit of a base station in a second radio access network (RAN), wherein the base station is configured to support connections by a wireless device to the base station using a second radio access technology (RAT) and to one or more serving cells in a first RAN using a first RAT that differs from the second RAT, cause the base station to:
  determine that a target base station for handover of the wireless device is a base station in the first RAN that does not support the second RAT; and
  refrain from passing access stratum (AS) context information to the target base station as part of the handover of the wireless device, to the target base station.

41. A wireless device adapted to perform a method according to any of example embodiments 1 to 14.

42. A network node adapted to perform a method according to any of example embodiments 15 to 19.

43. A computer program product, comprising instructions that, when executed on at least one processing circuit, cause the at least one processing circuit to carry out a method according to any one of example embodiments 1 to 19.

44. A carrier containing the computer program product of example embodiment 43, wherein the carrier is one of an electronic signal, optical signal, radio signal, or computer readable storage medium.

45. A communication system including a host computer comprising:
  processing circuitry configured to provide user data; and
  a communication interface configured to forward the user data to a cellular network for transmission to a user equipment (UE),
  wherein the cellular network comprises a base station in a second radio access network (RAN), wherein the base station is configured to support connections by the UE to the base station using a second radio access technology (RAT) and to one or more serving cells in a first RAN using a first RAT that differs from the second RAT, the base station having a radio interface and processing circuitry, the base station's processing circuitry being configured to determine that a target base station for handover of the wireless device is a base station in the first RAN that does not support the second RAT and refrain from passing access stratum (AS) context information to the target base station as part of the handover of the wireless device to the target base station.

46. The communication system of example embodiment 45, further including the base station.

47. The communication system of example embodiment 46, further including the UE, wherein the UE is configured to communicate with the base station.

48. The communication system of example embodiment 47, wherein:
  the processing circuitry of the host computer is configured to execute a host application, thereby providing the user data: and
  the UE comprises processing circuitry configured to execute a client application associated with the host application.

49. The communication system of example embodiment 47 or 48, wherein the UE comprises:
  transceiver circuitry configured for communicating with the serving cells in the first and second RANs; and
  processing circuitry operatively associated with the transceiver circuitry and configured to:
    receive, from the base station in the second RAN, using the second RAT, one or more handover commands as part of a handover of the wireless device to a base station in the first RAN;
    determine, based on the one or more handover commands, that the wireless device is to revert from a currently configured Packet Data Convergence Protocol (PDCP) configuration to a PDCP configuration associated with the first RAT: and
    revert to the PDCP configuration associated with the first RAT, in response to said determining 50. A method implemented in a communication system including a host computer, a base station and a user equipment (UE), the base station being in a second radio access network (RAN), wherein the base station is configured to support connections by a UE to the base station using a second radio access technology (RAT) and to one or more serving cells in a first RAN using a first RAT that differs from the second RAT, the method comprising:
  at the host computer, providing user data; and
  at the host computer, initiating a transmission carrying the user data to the UE via a cellular network comprising the base station, wherein the method comprises, at the base station:
    determining that a target base station for handover of the UE is a base station in the first RAN that does not support the second RAT; and
    refraining from passing access stratum (AS) context information to the target base station as part of the handover of the UE to the target base station.

51. The method of example embodiment 50, further comprising, at the base station, transmitting the user data.

52. The method of example embodiment 51, wherein the user data is provided at the host computer by executing a host application, the method further comprising, at the UE, executing a client application associated with the host application.

53. The method of any of example embodiments 50-52, further comprising, at the UE:
  receiving, from the base station in the second RAN, using the second RAT, one or more handover commands as part of a handover of the UE to a base station in the first RAN;
  determining, based on the one or more handover commands, that the UE is to revert from a currently configured Packet Data Convergence Protocol (PDCP) configuration to a PDCP configuration associated with the first RAT; and
  reverting to the PDCP configuration associated with the first RAT, in response to said determining.

54. A communication system including a host computer comprising:
  processing circuitry configured to provide user data; and
  a communication interface configured to forward user data to a cellular network for transmission to a user equipment (UE) configured to support connections to one or more serving cells in a first radio access network (RAN), using a first radio access technology (RAT) and to one or more serving cells in a second RAN,
  wherein the UE comprises a radio interface and processing circuitry, the UE's processing circuitry being configured to:
    receive, from a base station in the second RAN, using the second RAT, one or more handover commands as part of a handover of the UE to a base station in the first RAN;
    determine, based on the one or more handover commands, that the UE is to revert from a currently configured Packet Data Convergence Protocol (PDCP) configuration to a PDCP configuration associated with the first RAT; and
    revert to the PDCP configuration associated with the first RAT, in response to said determining.

55. The communication system of example embodiment 54, further including the UE.

56. The communication system of example embodiment 55, wherein the cellular network further includes a base station configured to communicate with the UE.

57. The communication system of example embodiment 55 or 56, wherein:
  the processing circuitry of the host computer is configured to execute a host application, thereby providing the user data: and
  the UE's processing circuitry is configured to execute a client application associated with the host application.

58. A method implemented in a communication system including a host computer, a base station and a user equipment (UE) configured to support connections to one or more serving cells in a first radio access network (RAN), using a first radio access technology (RAT) and to one or more serving cells in a second RAN, using a second RAT that differs from the first RAT, the method comprising:
  at the host computer, providing user data; and
  at the host computer, initiating a transmission carrying the user data to the UE via a cellular network, wherein the method comprises, at the UE:
    receiving. from a base station in the second RAN, using the second RAT, one or more handover commands as part of a handover of the wireless device to a base station in the first RAN;
    determining, based on the one or more handover commands, that the wireless device is to revert from a currently configured Packet Data Convergence Protocol (PDCP) configuration to a PDCP configuration associated with the first RAT; and
    reverting to the PDCP configuration associated with the first RAT, in response to said determining.

59. The method of example embodiment 58, further comprising, at the UE, receiving the user data from the base station.

60. A communication system including a host computer comprising:
  a communication interface configured to receive user data originating from a transmission from a user equipment (UE) to a base station,
  wherein the UE is configured to support connections to one or more serving cells in a first radio access network (RAN), using a first radio access technology (RAT) and to one or more serving cells in a second RAN, using a second RAT that differs from the first RAT, and wherein the UE comprises a radio interface and processing circuitry, the UE's processing circuitry being configured to:
    receive, from a base station in the second RAN, using the second RAT, one or more handover commands as part of a handover of the UE to a base station in the first RAN;
    determine, based on the one or more handover commands, that the UE is to revert from a currently configured Packet Data Convergence Protocol (PDCP) configuration to a PDCP configuration associated with the first RAT; and
    revert to the PDCP configuration associated with the first RAT, in response to said determining.

61. The communication system of example embodiment 60, further including the UE.

62. The communication system of example embodiment 61, further including the base station in the second RAN, wherein the base station in the second RAN comprises a radio interface configured to communicate with the UE and a communication interface configured to forward to the host computer the user data carried by a transmission from the UE to the base station in the second RAN.

63. The communication system of example embodiment 61 or 62, wherein:
  the processing circuitry of the host computer is configured to execute a host application; and
  the UE's processing circuitry is configured to execute a client application associated with the host application, thereby providing the user data.

64. The communication system of example embodiment 61 or 62, wherein:
  the processing circuitry of the host computer is configured to execute a host application, thereby providing request data; and
  the UE's processing circuitry is configured to execute a client application associated with the host application, thereby providing the user data in response to the request data.

65. The method of example embodiment 1, further comprising:
  providing user data; and forwarding the user data to a host computer via a transmission to a base station in the first RAN or the second RAN.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method, in a wireless device configured to support connections to one or more serving cells using LTE radio access technology (RAT) and to one or more serving cells using New Radio (NR) RAT, the method comprising:
   receiving one or more handover commands as part of a handover of the wireless device, while operating with a SRB1 configured with NR Packet Data Convergence Protocol (PDCP);
   determining, based on the one or more handover commands, that the wireless device is to revert from the currently configured NR PDCP configuration to an LTE PDCP configuration for the SRB1; and
   reverting to the LTE PDCP configuration for the SRB1, in response to said determining, wherein reverting to the LTE PDCP configuration for the SRB1 comprises changing one or more security algorithms for integrity protection and/or ciphering of SRB s or DRBs to security algorithm(s) for LTE, and wherein the method comprises identifying the security algorithms for LTE based on a mapping from corresponding security algorithm(s) for NR.

2. The method of claim 1, wherein the one or more handover commands comprise a Radio Resource Configuration (RRC) connection reconfiguration message.

3. The method of claim 1, wherein determining that the wireless device is to revert from the currently configured NR PDCP configuration to the LTE PDCP configuration for the SRB1 is further based on a determination that at least one of the following applies:
   the one or more handover commands include an indication that a full configuration should be used;
   the one or more handover commands lack any embedded NR RRC information;
   the one or more handover commands include SRB1 in an SRB add or modify information element;
   System Information broadcast by the target cell, as identified by the one or more handover commands, does not include any indication that LTE is supported or that dual connectivity involving LTE is supported;
   the one or more handover commands do not include a Secondary Cell Group configuration for LTE.

4. The method of claim 1, wherein reverting to the NR PDCP configuration comprises performing a security key derivation procedure using key derivation procedures for NR.

5. The method of claim 1, wherein the one or more handover commands include an indication that full configuration should be used, and wherein said reverting is responsive to determining that the one or more handover commands includes the indication that full configuration should be used.

6. A wireless device configured to support connections to one or more serving cells using LTE radio access technology (RAT) and to one or more serving cells using New Radio (NR) RAT, the wireless device comprising:
   transceiver circuitry configured for communicating with the serving cells in first and second Radio Access Networks (RANs); and
   processing circuitry operatively associated with the transceiver circuitry and configured to:
      receive one or more handover commands as part of a handover of the wireless device, while operating with a SRB1 configured with NR Packet Data Convergence Protocol (PDCP);
      determine that the wireless device is to revert from the currently configured NR PDCP configuration to an LTE PDCP configuration for the SRB1, based on the one or more handover commands; and
      revert to the LTE PDCP configuration for the SRB1, in response to said determining, wherein reverting to the LTE PDCP configuration for the SRB1 comprises changing one or more security algorithms for integrity protection and/or ciphering of SRBs or DRBs to security algorithm(s) for LTE, and wherein the method comprises identifying the security algorithms for LTE based on a mapping from corresponding security algorithm(s) for NR.

7. The wireless device of claim 6, wherein the one or more handover commands comprise a Radio Resource Configuration (RRC) connection reconfiguration message.

8. The wireless device of claim 6, wherein the processing circuitry is configured to determine that the wireless device is to revert from the currently configured NR PDCP configuration to the LTE PDCP configuration for the SRB1 based on a determination that at least one of the following applies:
   the one or more handover commands include an indication that a full configuration should be used;
   the one or more handover commands lack any embedded NR RRC information;
   the one or more handover commands include SRB1 in an SRB add or modify information element;
   System Information broadcast by the target cell, as identified by the one or more handover commands, does not include any indication that the second RAT is supported or that dual connectivity involving LTE is supported; and
   the one or more handover commands do not include a Secondary Cell Group configuration for LTE.

9. The wireless device of claim 6, wherein the processing circuitry is configured such that reverting to the NR PDCP configuration comprises performing a security key derivation procedure using key derivation procedures for NR.

10. The wireless device of claim 6, and wherein the processing circuitry is configured to perform said reverting in response to determining that at least one of the one or more handover commands includes an indication that full configuration should be used.

* * * * *